United States Patent
Wohaibi et al.

(10) Patent No.: US 11,920,095 B2
(45) Date of Patent: Mar. 5, 2024

(54) FUEL COMPOSITIONS FROM LIGHT TIGHT OILS AND HIGH SULFUR FUEL OILS

(71) Applicant: MAWETAL LLC, Nacogdoches, TX (US)

(72) Inventors: Mohammed Wohaibi, Nacogdoches, TX (US); Tom F. Pruitt, Nacogdoches, TX (US)

(73) Assignee: Mawetal LLC, Nacogdoches, TX (US)

( * ) Notice: Subject to any disclaimer, the term of this patent is extended or adjusted under 35 U.S.C. 154(b) by 0 days.

(21) Appl. No.: 17/513,214

(22) Filed: Oct. 28, 2021

(65) Prior Publication Data

US 2022/0098501 A1  Mar. 31, 2022

Related U.S. Application Data

(62) Division of application No. 17/036,441, filed on Sep. 29, 2020, now Pat. No. 11,214,744, which is a division of application No. 16/089,932, filed as application No. PCT/US2016/057546 on Oct. 18, 2016, now Pat. No. 10,883,056.

(51) Int. Cl.
| | |
|---|---|
| *C10L 1/04* | (2006.01) |
| *C10C 3/00* | (2006.01) |
| *C10G 63/06* | (2006.01) |
| *C10G 65/02* | (2006.01) |
| *C10G 67/04* | (2006.01) |
| *C10J 3/84* | (2006.01) |
| *F04D 13/08* | (2006.01) |
| *F04D 29/046* | (2006.01) |
| *F04D 29/60* | (2006.01) |

(52) U.S. Cl.
CPC .......... *C10G 67/0463* (2013.01); *C10C 3/002* (2013.01); *C10G 63/06* (2013.01); *C10G 65/02* (2013.01); *C10G 67/0454* (2013.01); *C10J 3/84* (2013.01); *C10L 1/04* (2013.01); *F04D 13/086* (2013.01); *F04D 29/0462* (2013.01); *F04D 29/606* (2013.01); *C10G 2300/202* (2013.01); *C10J 2300/165* (2013.01); *C10J 2300/1675* (2013.01); *C10J 2300/1807* (2013.01); *C10L 2200/0407* (2013.01); *C10L 2200/0438* (2013.01); *C10L 2270/02* (2013.01); *C10L 2270/026* (2013.01); *C10L 2270/04* (2013.01); *C10L 2270/08* (2013.01); *C10L 2290/06* (2013.01); *C10L 2290/10* (2013.01); *C10L 2290/543* (2013.01); *C10L 2290/544* (2013.01); *F05B 2240/52* (2013.01)

(58) Field of Classification Search
CPC ............................ C10L 1/04; C10L 2200/0438
See application file for complete search history.

(56) References Cited

U.S. PATENT DOCUMENTS

| | | | |
|---|---|---|---|
| 2,987,465 | A | 6/1961 | Johanson |
| 3,197,288 | A | 7/1965 | Johanson |
| 3,308,057 | A | 3/1967 | Van Driesen |
| 3,639,261 | A | 2/1972 | Slater |
| 3,775,304 | A | 11/1973 | McKinney et al. |
| 3,022,148 | A | 3/1976 | Thompson et al. |
| 4,640,762 | A | 2/1987 | Woods et al. |
| 4,824,552 | A | 4/1989 | Nagasawa et al. |
| 4,885,080 | A | 12/1989 | Brown et al. |
| 4,917,789 | A | 4/1990 | Butler et al. |
| 4,940,529 | A | 7/1990 | Beaton et al. |
| 5,066,476 | A | 11/1991 | Wetzel et al. |
| 5,124,027 | A | 6/1992 | Beaton |
| 5,322,829 | A | 6/1994 | Artes et al. |
| 5,962,763 | A | 10/1999 | Cossee et al. |
| 6,270,654 | B1 | 8/2001 | Colyar et al. |
| 6,329,725 | B1 | 12/2001 | Woodall et al. |

(Continued)

FOREIGN PATENT DOCUMENTS

| | | |
|---|---|---|
| CN | 103927461 | 7/2014 |
| CN | 205544287 | 8/2016 |

(Continued)

OTHER PUBLICATIONS

Mathpro, An Introduction to Petroleum Refining and the Production of Ultra Low Sulfur Gasoline and Diesel Fuel; Oct. 24, 2011; (38 pages); URL <http://www.theicct.org/sites/default/files/publications/ICCT05_Refining_Tutorial_FINAL_R1.pdf>; The International Council on Clean Transportation; United States.

Olsen, Tim; An Oil Refinery Walk-Through; Chemical Engineering Progress; May 2014; (8 pages); URL: <http://www2.emersonprocess.com/siteadmincenter/PM Articles/OilRefineryWalk-Through_CEP_May2014_Hi-Res.pdf>; American Institute of Chemical Engineers, United States.

U.S. Environmental Protection Agency, Sector Policies and Programs Division Office of Air Quality Planning and Standards; Available and Emerging Technologies for Reducing Greenhouse Gas Emissions from the Petroleum Refining Industry; Oct. 2010; (42 pages); URL: <https://www.epa.gov/sites/production/files/2015-12/documents/refineries.pdf>; U.S. EPA Research Triangle, NC, United States.

(Continued)

*Primary Examiner* — Randy Boyer
(74) *Attorney, Agent, or Firm* — Tom F. Pruitt

(57) ABSTRACT

Methods are provided to prepare a low sulfur fuel from hydrocarbon sources, such as light tight oil and high sulfur fuel oil, often less desired by conventional refiners, who split crude into a wide range of differing products and may prefer presence of wide ranges (C3 or C5 to C20 or higher) of hydrocarbons. These fuels can be produced by separating feeds into untreated and treated streams, and then recombining them. Such fuels can also be formulated by combinations of light, middle and heavy range constituents in a selected manner as claimed. Not only low in sulfur, the fuels of this invention are also low in nitrogen and essentially metals free. Fuel use applications include on-board large marine transport vessels but also on-shore for large land based combustion gas turbines, boilers, fired heaters and transport vehicles and trains.

10 Claims, 4 Drawing Sheets

(56) References Cited

U.S. PATENT DOCUMENTS

| | | | |
|---|---|---|---|
| 6,447,671 | B1 | 9/2002 | Morel et al. |
| 7,276,151 | B1 | 10/2007 | Okada et al. |
| 7,686,941 | B2 | 3/2010 | Brierley et al. |
| 7,799,207 | B2 | 9/2010 | Allinson et al. |
| 8,088,184 | B2 | 1/2012 | Hughes et al. |
| 8,987,537 | B1 | 3/2015 | Droubi et al. |
| 9,315,733 | B2 | 4/2016 | Koseoglu et al. |
| 10,443,006 | B1 | 10/2019 | Fruchey et al. |
| 10,597,594 | B1 | 3/2020 | Fruchey et al. |
| 10,883,056 | B2 | 1/2021 | Wohaibi et al. |
| 2001/0050244 | A1 | 12/2001 | Dldlllon et al. |
| 2002/0169220 | A1* | 11/2002 | Moore, Jr. ............... C01B 3/02 518/703 |
| 2003/0141220 | A1 | 7/2003 | O'Rear |
| 2004/0020826 | A1 | 2/2004 | Guyomar et al. |
| 2004/0232050 | A1 | 11/2004 | Marlin et al. |
| 2005/0028853 | A1 | 2/2005 | Houtan |
| 2005/0188606 | A1 | 9/2005 | Caprotti et al. |
| 2005/0288537 | A1 | 12/2005 | Maund et al. |
| 2006/0042999 | A1 | 3/2006 | Iqbal et al. |
| 2006/0133992 | A1 | 6/2006 | Dieckmann |
| 2006/0133993 | A1* | 6/2006 | Dieckmann ............. C01B 3/382 423/653 |
| 2006/0157385 | A1 | 7/2006 | Montanari et al. |
| 2006/0175229 | A1 | 8/2006 | Montanari et al. |
| 2007/0034550 | A1 | 2/2007 | Hedrick |
| 2007/0108100 | A1 | 5/2007 | Satchell |
| 2007/0187292 | A1* | 8/2007 | Miller .................... C10L 1/08 208/15 |
| 2007/0246399 | A1 | 10/2007 | Picard et al. |
| 2008/0011643 | A1 | 1/2008 | Lenglet |
| 2008/0060976 | A1 | 3/2008 | Brierley et al. |
| 2009/0159493 | A1 | 6/2009 | Bhattacharya |
| 2009/0165365 | A1 | 7/2009 | Jordan |
| 2009/0308788 | A1* | 12/2009 | Lenglet ................ C10G 65/18 208/57 |
| 2010/0077653 | A1 | 4/2010 | Hughes et al. |
| 2010/0206042 | A1 | 8/2010 | Johns et al. |
| 2010/0282640 | A1 | 11/2010 | Rojey et al. |
| 2011/0198265 | A1 | 8/2011 | Colvar et al. |
| 2011/0220547 | A1 | 9/2011 | Bourane et al. |
| 2012/0004478 | A1 | 1/2012 | Umansky et al. |
| 2013/0185044 | A1 | 7/2013 | Chen et al. |
| 2014/0001092 | A1 | 1/2014 | Mezza et al. |
| 2014/0221713 | A1 | 8/2014 | Baldassari et al. |
| 2015/0041634 | A1 | 2/2015 | Quann et al. |
| 2015/0152027 | A1* | 6/2015 | Shafi ...................... C07C 4/06 585/653 |
| 2015/0353851 | A1 | 12/2015 | Buchanan |
| 2015/0376513 | A1 | 12/2015 | Van Wees et al. |
| 2016/0138392 | A1 | 5/2016 | Pomerantz |
| 2016/0281009 | A1 | 9/2016 | Aubry et al. |
| 2018/0230387 | A1 | 8/2018 | Moore |
| 2019/0093026 | A1 | 3/2019 | Wohaibi |
| 2019/0093037 | A1* | 3/2019 | Berkhous ................ C10L 1/02 |
| 2019/0185772 | A1 | 6/2019 | Berkhous |
| 2020/0165535 | A1 | 5/2020 | Fruchey |
| 2020/0277533 | A1 | 9/2020 | Markkanen |
| 2020/0291318 | A1 | 9/2020 | Shetkar |

FOREIGN PATENT DOCUMENTS

| | | | |
|---|---|---|---|
| EP | 2615264 | | 7/2013 |
| EP | 3020788 | | 5/2016 |
| FR | 2843968 | | 3/2004 |
| KR | 20160010369 | | 7/2016 |
| WO | WO1999/047626 | | 9/1999 |
| WO | WO1999/049003 | | 9/1999 |
| WO | WO2009/080679 | | 7/2009 |
| WO | WO-2013087942 | A1 * | 6/2013 ............. C10G 2/332 |
| WO | WO2015/000841 | | 1/2015 |
| WO | WO2016/089590 | | 6/2016 |

OTHER PUBLICATIONS

U.S. Energy Information Administration; Glossary; at least as early as Oct. 11, 2016; (17 pages); URL: <https://www.eia.gov/tools/glossary/index.cfm?id=petroleum>.

U.S. Energy Information Administration; Oil: Crude and Petroleum Products Explained; at least as early as Oct. 11, 2016; (3 pages); URL: <https://www.eia.gov/energyexplained/index.php?page=oil_refining#tab2>.

U.S. Energy Information Administration; Petroleum & Other Liquids, Refinery Yield; Jul. 31, 2018; (1 page); URL <https://www.eia.gov/dnav/pet/PET_PNP_PCT_DC_NUS_PCT_A.htm>.

Petrojam Limited; Hydroskimming—The Refinery Process; 2012; (3 pages) URL: <http://www.petrojam.com/resources/11/general/hydroskimming-refinery-process>; Petrojam Processing Plant, Kingston, Jamaica.

Hague, Kjeil; Refining ABC; at least as early as Oct. 11, 2016; (13 pages); URL <http://www.statoil.com/en/InvestorCentre/Presentations/Downloads/Refining.pdf>; Equinor ASA, Stavanger Norway (formerly Statoil).

International Energy Agency; IEA Refinery Margins, Methodology Notes; Sep. 2012; (14 pages); URL <https://www.iea.org/media/omrreports/Refining_Margin_Supplement_OMRAUG_12SEP2012.pd>; International Energy Agency, Paris, France.

Jechura, John; Petroleum Refining; Aug. 11, 2016; (45 pages); URL: <http://inside.mines.edu/~jjechura/Refining/01_Introduction.pdf>; Colorado School of Mines, Golden, CO, US.

Wikipedia; Petroleum Refining Processes; at least as early as Oct. 11, 2016; (7 pages); URL <https://en.wikipedia.org/wiki/Petroleum_refining_processes#The_crude_oil_distillation_unit>.

Occupational Safety and Health Administration; OSHA Technical Manual, Section IV: Chapter 2—Petroleum Refining Process; at least as early as Oct. 11, 2016; (30 pages); URL <https://www.osha.gov/dts/osta/otm/otm_iv/otm_iv_2.html>; U.S. Department of Labor, United States.

Bagajewicz, Miguel J.; CHE 5480 Simulation, Optimization and Decision Making in Oil and Gas Processing, Lecture—Petroleum Fractionation-Overview, *Overview of Crude Units*; Spring 2007; (35 pages) URL: <http://www.ou.edu/class/che-design/che5480-07/Petroleum%20Fractionation-Overview.pdf>; University of Oklahoma, United States.

Jechura, John; Hydroprocessing: Hydrotreating & Hydrocracking, Chapters 7 & 9; 2017; (56 pages); URL: <http://inside.mines.edu/~jjechura/Refining/08_Hydroprocessing.pdf>; Colorado School of Mines, Golden, CO, United States.

Vermeire, Monique B.; Everything You Need to Know About Marine Fuels; Jun. 2012; (32 pages); URL: <http://www.chevronmarineproducts.com/docs/Chevron_EverythingYouNeedToKnowAboutFuels_v3_1a_DESKTOP.pdf>; Chevron Global Marine Products, Ghent, Belgium.

United States Coast Guard; Ultra Low Sulfur Fuel Oil & Compliance with MARPOL Requirements, Nov. 19, 2015, URL: <https://www.uscg.mil/hq/cg5/cg545/alerts/0215.pdf>.

Gavriil, Gavriil et al.; Steaming Heat Coils for Heating Up Marine Heavy Fuel Oil; 8th GRACM International Congress on Computational Mechanics, Volos; Jul. 12-Jul. 15, 2015; (8 pages); URL: <www.8gracm.mie.uth.gr/Papers/Session%20D3-C3/G.%20Prodromidis.pdf>; Department of Environmental & Natural Resources Management, University of Patras, Greece and Marine Boiler Repairs Ltd., Greece.

Wright, A.A. et al.; Flashpoint of Marine Distillate Oil Fuels, Issues and Implications Associated With the Harmonization of the Minimum Flashpoint Requirement for Marine Distillate Oil Fuels with that of Other Users; Jan. 27, 2012; URL: <https://docplayer.net/14610950-Flashpoint-of-marine-distillate-oil-fuels.html>; Lloyds Register, fobas/001386/2011-4.

American Bureau of Shipping; Notes on Heavy Fuel Oil; Jan. 1984; (68 pages); URL: <https://ww2.eagle.org/en/rules-and-resources/rules-and-guides.html#/content/dam/eagle/rules-and-guides/current/other/31_heavyfueloil>; American Bureau of Shipping, Houston, TX, United States.

(56) References Cited

OTHER PUBLICATIONS

What-When-How; Separation Process; at least as early as Oct. 11, 2016; (5 pages); URL <http://what-when-how.com/petroleum-refining/separation-processes/>.
Morel, F. et al.; Hydrocracking Solutions Squeeze more ULSD from Heavy Ends; Hydrocarbon Processing; Nov. 2009; (8 pages); URL: <http://www.axens.net/document/15/hydrocracking_hp2009/english.html>; Axens IFP Group Technologies.
Amerigreen Energy; Ultra Low Sulfur Heating Oil FAQ's; Oct. 6, 2015; (3 Pages); URL: <http://www.amerigreen.com/education-article/ultra-low-sulfur-heating-oil-faqs/>; Amerigreen Energy, Lancaster, PA, United States.
Rising, Bruce et al.; Survey of Ultra-Trace Metals in Gas Turbine Fuels; Prepr. Pap-Am. Chem. Soc., Div Fuel Chem 2004, 49 (1), 404 (3 pages); URL <https://web.anl.gov/PCS/acsfuel/preprint%20archive/Files/49_1_Anaheim_03-04_0882.pdf>.
S&P Global Platts; Why High Sulfur Distillate Still Finds a Home in the U.S. Oil Market; Jul. 5, 2012; (5 Pages); URL <http://blogs.platts.com/2012/07/05/why_high_sulfur/>; The Barrell Blog.
Sharmak, B.K. et al.; Maltens and Asphaltenes of Petroleum Vacuum Residues: Physico-Chemical Characterization; Petroleum Science and Technology, 25: 93-104, 2007; (12 pages); URL: <http://naldc.nal.usda.gov/download/20659/PDF>; Taylor & Francis Group, United States.
Auers, John R. et al.; The North Dakota Petroleum Council Study on Bakken Crude Properties; Bakken Crude Characterization Task Force; Aug. 4, 2014; (78 pages); URL: <http://www.ndoil.org/image/cache/Bakken_Quality_Report.pdf>; Prepared for the North Dakota Petroleum Council by Turner Mason & Company Consulting Engineers, Dallas, TX, United States.
International Maritime Organization; Sulphur Oxides (SOx) and Particulate Matter (PM)—Regulation 14; at least as early as Oct. 11, 2016; (2 pages); URL: <http://www.imo.org/en/OurWork/environment/pollutionprevention/airpollution/pages/sulphur-oxides-(sox)---regulation-14.aspx >; International Maritime Organization; London, UK.
International Standards Organization (ISO), Table 2-Residual marine Fuels; 2012 (2 pages); URL: <http://a.pmcdn.net/p/xbw/iso/iso8217_2012_residual.pdf>; International Standards Organization. Geneva, Switzerland.
Sabathier, J. et al.; Framework Contract for Technical Support in Relation to the Quality of Fuels, Advice on Marine Fuel; Draft Report No. 201131; Oct. 2003; (27 pages); URL: <http://ec.europa.eu/environment/air/pdf/beicipfranlab_report.pdf>; BeicipFranlab, Rueil-Malmaison Cedex, France.
Powerscorcard, Electricity from Oil; 2002 (x pages); URL: <http://powerscorecard.org/tech_detail.cfm?resource_id=8>; Pace University, Energy and Climate Center, White Plains New York.
International Energy Agency; Energy Snapshot of the Week; Mar. 31, 2015; (2 pages); URL: <https://www.iea.org/newsroomandevents/graphics/2015-03-31-crude-oil-for-electricity-production-japan.html>.
European Environment Agency; Electricity Production by Fuel (ENER 027)—Assessment Published Apr. 2012; Apr. 30, 2012; (6 pages); URL <http://www.eea.europa.eu/data-and-maps/indicators/electricity-production-by-fuel-1/electricity-production-by-fuel-assessment-3>.
European Environment Agency; Graph Image, Gross Electricity Production by Fuel; Apr. 30, 2012; (1 page); URL <http://www.eea.europa.eu/data-and-maps/figures/gross-electricity-production-by-fuel-4/ener27_fig_01/image_large>.
Environment Canada, Emergencies Science and Technology Division; Gas Turbine Fuel Oil; at least as early as Oct. 11, 2016; (1 page); URL: <http://www.etc-cte.ec.gc.ca/databases/Oilproperties/pdf/WEB_Gas_Turbine_Fuel_Oil.pdf>.
Royal Academy of Engineering; Future Ship Powering Options, Exploring Alternative Methods of Ship Propulsion; Jul. 2013; (51 Pages); URL: >http://www.raeng.org.uk/publications/reports/future-ship-powering-options>.
Toepfer, Josiah; Is it True that the 15 Biggest Ships in the World Produce More Pollution than All the Cars?; Jun. 11, 2016; (5 pages); URL: ,https://www.quora.com/Is-it-true-that-the-15-biggest-ships-in-the-world-produce-more-pollution-than-all-the-cars>; QUORA.Com.
Rall, H.T. et al.; Sulfur Compounds in Crude Oil; 1972; (194 pages); URL: <https://digital.library.unt.edu/ark:/67531/metadc12804/>; United States Department of the Interior, Bureau of Mines; UNT Digital Library.
Wauquier, Jean Paul; Crude Oil Petroleum Products, Process Flowsheets; 1995; (492 pages); URL: <https://archive.org/details/WauquierJeanPierre1995PetroleumRefiningV1CrudeOilPetroleumProductsProcessFlowsheets>; Editions Technip, Paris, France.
Rettger, Phil et al.; Gasification Technologies, the Long Lake Integrated Upgrading Project: Status Report and Discussion of Soot Processing; Oct. 1-4, 2006; (9 pages); URL: <http://w3.siemens.com/markets/global/en/oil-gas/PublishingImages/technologies/water-technology/products/zimpro/Gassification_Technologies.pdf>. Gasification Technologies, Washington, D.C., United States.
Council of the European Union; Council Directive 1999/32/ed, Apr. 26, 1999, (21 pages); URL < https://energy-community.org/dam/jcr:a1750e98-dbac-4bce-be0b-10de788bbe01/Directive_1999_32_EC.pdf>.
Baker & O'brien Incorporated; Refining America's New Light Tight Oil (LTO) Production; OPIS 16th Annual National Supply Sumit, Las Vegas, Nevada, Oct. 28, 2014 (23 pages); URL: <http://www.bakerobrien.com/bakerobrien2/assets/File/Baker%20%20O'Brien%20OPIS%20National%20Supply%20Summit%20-%2010-28-14.pdf>.
Benoit, Brian et al.; Overcoming the Challenges of Tight/Shale Oil Refining; Processing Shale Feedstocks 2014; 8 pages); URL: <https://www.suezwatertechnologies.com/kcpguest/documents/Technical%20Papers_Cust/Americas/English/Overcoming_Challenges_of_Tight_Shale_Oil_Refining.pdf>; GE Water & Process Technologies.
Jukic, Ante; Petroleum Refining and Petrochemical Processes; 2013; (21 pages); URL: <https://www.fkit.unizg.hr/_download/repository/PRPP_2013_Natural_gas.pdf>; Faculty of Chemical Engineering and Technology, University of Zagreb, Croatia.
Eberhart, Dan; Light on Top, Heavy on the Bottom: A Crude Oil Refinery Primer; Feb. 14, 2014; (3 pages); URL: <http://www.team-bhp.com/forum/attachments/indian-car-scene/1455020d1451570702-official-fuel-prices-thread-crude-light-top-heavy-bottom-crude-oil-refinery-primer-canary-llc.pdf>; Canary USA.
Mathpro, Inc.; Effects of Possible Changes in Crude Oil Slate on the U.S. Refining Sector's CO2 Emissions, Final Report; Mar. 29, 2013; (59 pages); URL: <http://www.theicct.org/sites/default/files/publications/ICCT_Refinery_GHG_Study_Proj_Report_Apr. 2013.pdf>; Prepared for International Council on Clean Transportation.
Meher-Homji, Cyrus B. et al.; Gas Turbine Fuels-System-Design, Combustion and Operability; Proceedings of the Thirty-Ninth Turbomachinery Symposium, 2010; (32 pages); URL: <http://turbolab.tamu.edu/proc/turboproc/T39/ch16_Meher-Homji.pdf>/.
Welch, Mike et al.; Contaminants' Impact on Gas Turbine Operation; Jul. 31, 2014 (6 pages); URL: <http://www.plantservices.com/articles/2014/contaminants-impact-on-gas-turbine-operation/>; Plant Services, Schaumburg, IL, United States.
Welsch, Michael et al., Gas Turbine Fuel and Fuel Quality Requirements for Use in Industrial Gas Turbine Combustion, Proceedings of the Second Middle East Turbomachinery Symposium, Mar. 17-21, 2013; (10 pages); URL: < http://www.energy.siemens.com/us/pool/hq/energy-topics/pdfs/en/techninal%20paper/Siemens-Technical%20Paper-Gas-Turbine-Fuel-Quality-Requirements.pdf>; Turbomachinery Laboratory, Texas A&M University, United States.
Poloczek, Volker et al.; Modern Gas Turbines with High Fuel Flexibility; Power-Gen Asia 2008—Kula Lumpur, Oct. 21-23, 2008; (19 pages); URL: <http://www.energy.siemens.com/us/pool/hq/energy-topics/pdfs/en/gas-turbines-power-plants/ModernGasTurbineswithHighFuelFlexibility.pdf>; Siemens AG, Energy Sector, Germany.
Igoe, Brian M. et al.; Impact of Fuel Contaminants on Gas Turbine peration; 21st Symposium of the Industrial Application of Gas Turbines Committee, Banaff, Alerta, Canada, Oct. 2015; 15-IAGT-

(56) References Cited

OTHER PUBLICATIONS

303; (12 pages); URL: <https://www.eiseverywhere.com/file_uploads/7d3f5d08720db271571c4c47ble66fa7_303Finalpaper.pdf>.

Office of Energy Efficiency & Renewable Energy; Hydrogen Production: Natural Gas Reforming; at least as early as Oct. 11, 2016 (x pages); URL: <http://energy.gov/eere/fuelcells/hydrogen-production-natural-gas-reforming>; U.S. Department of Energy, Washington DC, United States.

PCT International Search Report and Wrotten Opinionin PCT International Application Serial No. PCT/US2016/057536 dated Feb. 24, 2017.

Scott; R. Derek; Ship to Shore Power US Navy Humanitarian Relief; 2006; 7 pages; Massachusetts Institute of Technology, 6.691 Seminar in Electric Power Systems; US Navy.

Siemens; A New Concept for Japan's Power Needs; Pictures of the Future; https://www.siemens.com/innovation/en/home/pictures-of-the-future/energy- and-efficiency/sustainable-power-generation-power-ship-japan.html; Mar. 5, 2015; 3 pages; Siemens Corporation.

LNG/Floating LNG (Mitsubishi), https://www.mhicompressor.com/en/products/outine/detail/Ing.html; Dec. 17, 2018 download; 3 pages; Mitsubishi Heavy Industries Compressor Corporation.

Wang et al; Costs and Benefits of Shore Power at the Port of Schenzhen; ICCT; Wilson Center; Dec. 2015 (37 pages).

United States International Searching Authority; PCT International Search Report and Written Opinion in PCT International Application Serial No. PCT/US2016/057546 dated Mar. 16, 2017 (15 pages).

United States International Preliminary Examinaton Authority; International Preliminary Report on Patentability (Chaper II) for PCT/US2016/057540; 27 pages; dated Dec. 27, 2018; US.

United States International Searching Authority; PCT International Search Report and Written Opinion in PCT International Application Serial No. PCT/US2016/057540 dated May 1, 2017 (16 pages).

United States International Preliminary Examinaton Authority; International Preliminary Report on Patentability (Chaper II) for PCT/US2016/057546; 59 pages; dated Feb. 15, 2018; US.

J Prousalidis: ""Improving the Efficiency of Ship Energy Chain within the All Electric Ship Framework" The Greek Section of The Society of Naval Architects and Marine Engineers (SNAME) Improving the Efficiency of Ship Energy Chain within the All Electric Ship Framework of Naval Architecture and Marine Engineering", Sep. 19, 2013 (Sep. 19, 2013), XP055698669, Retrieved from the Internet: RL:https://higherlogicdownload.s3.amazonaws.com/SNAME/a09ed13cb8c0-4897-9e87-eb86f500359b/UploadedImages/Presentation,%20Prousalidis,%2019%20Sept%202013.pdf [retrieved on May 26, 2020].

Bill Siuru: "A crew prepares Cold ironing: An approach to shipaEUR(TM)s power whose time has come 12:00 AM" Apr. 10, 2008 (Apr. 10, 2008), XP055698672, Retrieved from the Internet: URL:http://www.professionalmariner.com/April-2008/Cold-ironing-An approach-to-ship-226-128-153s-power-whose-time-has-come/ ; [retrieved on May 26, 2020].

Wauquier, Jean-Pierre; Petroleum Refining, vol. 2 Separation Processes, Ch 5; Distillation, Absorption and Stripping in the Petroleum Industry, 2000, pp. 221-224; 2000.

United States International Preliminary Examinaton Authority; International Preliminary Report on Patentability (Chaper II) for PCT/US2016/057536; 54 pages; dated Apr. 26, 2019; US.

Smyshlyaeva et al; Influence of Asphaltenes on the Low-Sulphur Residual Marine Fuels' Stability; Journal of Marine Science and Engineering; 13 pages; Nov. 8, 2021; J. Mar. Sci. Eng. 2021, 9, 1235. https://doi.org/10.3390/jmse9111235.

\* cited by examiner

FUEL COMPOSITIONS FROM LIGHT TIGHT OILS AND HIGH SULFUR FUEL OILS

CROSS REFERENCE TO RELATED APPLICATIONS

This application is a divisional of U.S. Ser. No. 17/036,441 filed on 29 Sep. 2020, which is a divisional of U.S. Ser. No. 16/089,932 filed 28 Sep. 2018 issued under U.S. Pat. No. 10,883,056 on May 9, 2019, which is a 371 National Phase of International Application Ser. No. PCT/US2016/057546 filed 18 Oct. 2016, all of which are incorporated herein by reference.

FIELD OF THE INVENTION

This invention provides novel methods to make fuel and prepare compositions that simulate fuels having a wide range (C3 or C5 to C20+ or higher) of hydrocarbons produced from crude oil. Preferred feeds to processes of this invention are hydrocarbon sources not always preferred by conventional refiners as feedstock, such as for illustration, refinery intermediate residues, high sulfur fuel oils, lower sulfur fuel oils or light tight oils, condensates, extra heavy crude, tar sands, and dilbits. The fuels provided by this invention are ultraclean fuel, being very low in sulfur and nitrogen, with so low in metals by many measurement techniques, they are hard to detect and essentially metals free and are especially cost effective not only for use on-board large marine transport vessels but also on-shore for large land based combustion gas turbines, boilers, and transport vehicles and trains.

BACKGROUND OF THE INVENTION

This invention targets at least three issues: (1) conversion of low value hydrocarbons to higher value fuels, (2) cost effective reduction of sulfur and nitrogen, and substantial elimination of metals from such fuels and (3) tailoring such fuels for use in marine or land based engines, combustion gas turbines, or fired heaters such as boilers.

Certain hydrocarbon sources are not desired as refinery feeds and thus may be assigned a low value by refiners. Conventional refiners seek to split each barrel of crude having a full or broad range of hydrocarbons into multiple fuel products and feedstocks from downstream chemicals manufacture. Refiners often prefer feeds having a broad range of hydrocarbons. To compete in an arena that often has very narrow margins, certain refiners need most of a full carbon range of crudes to complete material and energy balances required to seek to fill all unit operations, as well as meet customer supply commitments, but those refiners also prefer feeds that do not pose processing challenges or increase processing costs.

Conventional refineries face processing issues, for example, with very heavy crudes such as Maya (Mexico), BCF-17 (Venezuela) and Oriente (Equador) offering apparatus, operating and investment cost challenges, which likewise may arise also with processing of oil shales derived from organic rich sedimentary kerogen-containing rocks and condensates. Conventional refineries also face processing issues with light tight oils, which one might describe, when comparing to crude oil, as 'missing most of the bottom of the barrel'. Light tight oils (also referred to simply as tight oils), now widely available as being produced from shales and other low permeability formations such as sandstone or carbonates. Compared to conventional crude oils, tight oils may have excessive light ends but relatively little or no hydrocarbons within the ranges refiners might refer to as "vacuum gas oil" range or "heavy residual" or "vacuum resid" ranges, boiling above about 425° C. or 565° C. respectively, or 'bottom of the barrel' heavy range materials. See Refining America's New Light Tight Oil Production, OPIS 16$^{th}$ Annual National Supply Summit, Las Vegas October 2014) Baker & O'Brien.

The term "tight oil", "light tight oil" or "LTO", as used herein means a well head condensate, non-associated natural gas condensates, or shale gas condensate having (i) sulfur content in the ranges of nearly not measureable or none (0) wt. % to 0.2 wt. %, a (ii) a density, API (Deg) in the range of 38 to 57 degrees, (iii) traces of metals and (iv) wide variations of hydrocarbon ranges based sources. Not all are the same. LTOs from different sources will differ in distillation cut fraction ranges. Using description of ranges certain refiners may use to characterized fractions, illustrative variations of LTO may comprise (a) 5 to 20 wt. % liquefied petroleum gas range, (b) 10 to 35 wt. % naphtha, (c) 15 to 30 wt. % kerosene/jet range, (d) 15 to 25 wt. % diesel and heavier distillates, (e) trace to 10% or more vacuum gas oils and (f) no (0%) to about 5 wt. % or more heavy residuals.

Such light tight oils, especially those with trace heavy gas oil and essential no or very low heavy residuals, do not contain sufficient heavier hydrocarbons within its bottoms fractions within gas oil and residuals ranges to providing processing balance for desulfurization or other hydrotreating, nor corresponding residuals sufficient to support process hydrogen generation to enable cost effective processing such light crude to hydrogenate to lower sulfur and metals for decontamination or have sufficient lubricity to support use in certain types of engines. See for illustration "The North Dakota Petroleum Council Study on Bakken Crude Properties Bakken Crude Characterization Task Force" (2014), Turner & Mason provides composition ranges for certain tight oils. Those skilled in the art appreciate that, in order to balance the mix of product cuts from a crude distillation tower to fit many refinery operations, blending tight oils with heavy asphaltic crude makes sense, as the blend can result in a desirable distillation profile for many refiners. However, this practice can also lead to compatibility issues, for example, asphaltene destabilization. See "Overcoming the Challenges of tight/shale oil refining". Processing Shale Feedstocks (2014) Benoit et al.

Processing issues are also faced by conventional refineries with high sulfur fuel oils or "HSFO", which one might describe, when comparing to crude oil, as being part of the 'bottom of the barrel' or 'missing most of the top of the barrel'. In different usages in the art, the term "high sulfur fuel oil" or "HSFO" has been assigned different, often dissimilar, conflicting and confusing means in various technical articles, patents, and statutes, some of which change over time. Broad use of the phrase 'high sulfur fuel oil' has been used to describe a wide range of materials, including those outside of use of fuels, ranging from lighter, lower boiling, but high sulfur (hence high smoke) kerosene to heavy marine bunker fuels having greater than 3.5 wt. % sulfur content or to masut or other heavy residual 'bottom of the barrel' materials, which in some instances do not have a clear or uniformly applied specification. Certain index reporting systems base HSFO on RMG 3.5% sulfur quality fuel oil per ISO 8217 specifications, while others use different sulfur content.

As used in the specification and claims, "high sulfur fuel oil" or "HSFO" means any material used as fuel having sulfur content in excess of 0.50% m/m (0.5 wt. %). As used herein, the terms "heavy oils", "heavy residual oil", "residuals", "residue" or "other heavier oils", "tar sand" and "extra heavy crude" such as petroleum derived hydrocarbonaeous materials having a sulfur content in excess of 0.50% m/m (0.5 wt. %). The term "high sulfur" means above the target sulfur content limit of a fuel or statutory sulfur limit where applicable, whichever is lower.

Another issue is that markets for high sulfur fuel oil have been reduced, and large quantities of HSFO are un-blendable or un-transportable. In many countries where power plants fired HSFO to supply electricity utility demands, natural gas has been substituted due to local supply. For illustration, during about 2015, Mexico became an exporter of HSFO instead of a net importer, when power plants converted to local supplies of natural gas.

For example, in parts of the United States, some states have changed their requirements for home heating oil to 500 ppmwt or less sulfur in lieu of 2,000 ppmwt sulfur or higher. One result has been that certain pipelines and distribution networks refuse to transport 'high sulfur fuel oil', with an associated impact being oversupply of high sulfur fuel oil in certain areas, especially where local refiners do not have feeds, apparatus or technology to efficiency process low sulfur fuel oil. For many refinery managers, there is no practical residue upgrading choice for dealing with HSFO investment returns for the required capital expenditures would be much lower than alternative investments. Use of HSFO for turbine fuels leads to corrosion and fouling problems, and lost reliability.

Prior art refinery designs use atmospheric crude and/or vacuum distillation units, solvent separations, hydrotreating, gasification, and many other unit operations, to split each barrel of crude feed into multiple products each with different specifications for different applications or downstream processing.

With hydroskimming refineries, crude is converted to multiple products akin to topping refineries, but typically with the limited addition of heavy naphtha reformers that also generate hydrogen which is consumed by hydrotreaters in producing diesels. Hydroskimmers, like topping refineries, typically make a wide range of gasoline, kerosene, diesel and fuel oil for local consumption, not just one product. Various aspects of adapting hydrotreating, including having separate series or parallel hydrotreating reactor zones or having integrated hydrotreating reactor zones, are known in art. PCT/US1999/00478 (1998) published by Cash et al, and the references cited therein, disclose integrated hydrocracking and hydrotreating of dissimilar feeds, where hydrogen-containing and liquids-containing streams from separate hydrotreating zones are shared or combined in the manner disclosed therein.

Treating heavy crudes and residuals by residue hydroconversion via ebullated bed reactors has been known in the art since early ebullated systems were described in U.S. Pat. No. 2,987,465 (1961) and 3,197,288 (1965) to Johanson. An ebullated-bed reactor includes flowing contact of heavy hydrocarbon liquids with hydrogen in the presence of catalyst within a reactor vessel, with associated various ancillary gas/liquid separators and hydrogen makeup and recycle streams, and sulfur contain gas treatment systems, are well known and commercial practiced in the art. U.S. Pat. No. 6,270,654 to Colyar et al describes series ebullated reactors and U.S. Pat. No. 6,447,671 describes hydroconversion step via an ebullated reactor and a hydrotreating step via fixed bed hydrotreater. Publication number US20140221713A1 (U.S. Ser. No. 13/758,429) 2014 by Baldassari et al describes various hydroconversion, hydrocracking and hydrotreating catalyst as well hydroconversion, hydrocracking and hydrotreating processes including variations of integrated hydroconversion, hydrocracking and hydrotreating apparatus. Baldassari et al further summarizes variations of catalyst compositions and condition ranges for distillate and heavy oil hydrotreating and distinguishes over conditions for hydrocracking and for residue hydroconversion, all of which are known those skilled in the art of hydroprocessing.

Various aspects of use of solvent separation, to extract deasphalted oil from pitch within heavy residual streams, and use the deasphalted oil as feed to hydroprocessing are known in art when used to produce multiple product streams. For example, U.S. Pat. No. 7,686,941 (2010) to Brierley et al discusses solvent deasphalting for production of deasphalted oil, without cracking or degradation by separation of the feed based on solubility in a liquid solvent, such as propane or other paraffinic solvent such butane and pentane and pitch residue which contains a high metals and sulfur content. In Brierley, the deasphalted oil is hydrocracked and hydrotreated for sulfur, nitrogen and metals removal as discussed in such reference for production of several products including naphtha, kerosene, diesel and a residual material.

Publication PCT/FR2006/000671(U.S. Ser. No. 11/912,771) 2009 to Lenglet describes a process for pre-refining crude oil for the production of two asphaltenic oils and an asphaltenic oil involving pre-distillation, vacuum distillation, solvent deasphalting, hydrotreating, hydrocracking and residue hydroconversion to produce multiple products. "Revamping Diesel Hydrotreaters For Ultra-Low Sulfur Using IsoTherming Technology" by Ackerson et al discusses unit design, catalyst choices, hydrogen consumption, and other operating conditions for sulfur removal by hydrogenation to produce a product containing less than 8 ppm sulfur by use of a high activity Ni/Mo catalyst. "Optimizing Hydroprocessing Catalyst Systems for Hydrocracking and Diesel Hydrotreating Applications, Flexibility Through Catalyst" by Shiflet et al, page 6 Advanced Refining Technologies Catalagram Special Edition Issue No. 113/2013 also discusses hydroprocessing to 10 ppm or less levels using high activity CoMo catalyst to remove unhindered sulfur and a high activity NiMo catalyst for remaining sterically hindered sulfur.

Thus while many improvements have been made to address technical issues arising from processing light tight oils and heavy residues in conventional refineries, significant problems remain without solutions. Such issues continue to cause technical gaps resulting in substantial underutilization of light tight oils and high sulfur fuel oils

BRIEF SUMMARY OF THE INVENTION

This invention fills a technical gap enabling use of light tight oils and high sulfur fuel oils in effective low cost production of large quantities of fuels having very low sulfur and nitrogen, and essentially metals free. Such fuels are particularly useful offshore in marine applications as well as in large scale onshore applications such as combustion gas turbines for power generation. As used in the specification and claims, the terms "essentially metal free" or "zero metals" means metals content of zero to less than 100 ppb (parts per billion) or less or a content which is so low that it is difficult to measure reliably by conventional online instrumentation.

This invention provides novel methods to prepare from high sulfur fuel oil and light tight oil a composition which simulates a fuel produced from crude, which fuel has a wide range (C3 or C5 to C20+ or higher) of hydrocarbons. Preferred feeds to processes of this invention are hydrocarbon sources not always preferred by conventional refiners as feedstock, such as for illustration high sulfur fuel oils or light tight oils.

The fuels provided by this invention are ultraclean fuel, being very low in sulfur and nitrogen, essentially metals free and are especially cost effective not only for use on-board large marine transport vessels but also on-shore for large land based combustion gas turbines, boilers, and transport vehicles and trains.

In conventional refining, crude oil feed is cut into many pieces, and each piece is sent down a separate market path. Opposite thereto, we have found that we can take a 'top of barrel' light tight oil and a 'bottom of the barrel' high sulfur fuel oil, and combine them in a low cost manner to produce a fuel, simulating a fuel manufactured from crude oil and having a wide range of hydrocarbons.

This invention provides a low cost system to combine light tight oils with residual oils in a low cost manner to make large commercial quantities of clean fuels that replace high sulfur bunker fuels and other heavy residuals used in commercial transport ships and power plant combustion systems. This invention provides those fuels, and methods and apparatus for making such fuels, to reduce emissions of sulfur, nitrogen and noxious metals in a cost efficient manner. For the shipping industry, the novel configurations of this invention provide low cost, low sulfur marine fuels in quantities needed to meet or exceed worldwide marine sulfur reduction goals. Also, fuels of this invention also provide an alternative to firing crude oil or heavy residuals in large land based combustion turbines deployed by utilities, for illustration, single cycle or combined cycle power plants such as those producing electricity and desalinated water. Turbines firing the fuels of this invention have significantly less turbine flue gases emissions of NOx, SOx, CO2, soot, noxious metals, and other combustion byproducts, also less corrosion of hot zones or fouling under ash formation conditions, when firing a contaminated heavy crude or refinery residual oil, depending on feed source.

These novel processes use counter-intuitive steps to lower production costs, while controlling final product sulfur content at or below target sulfur levels in a surprisingly effective manner Conventional refining does not separate cuts then recombine them.

For example, in the conventional art of blending, blending focus is on blending to form gasolines or blends to form diesels or blends to form jet fuels, but not blends of all separate refinery production to form just one fuel. That is, crude oil is not separated by distillation to many fractions, only to then all be recombined. For illustration, the art teaches away from blending any large amount of diesel range materials with a gasoline range. Also end-users are discouraged from blending diesels with gasolines. Likewise, confusion surrounds the terms "kerosene" and "light distillate" because such are often assigned the same, overlapping or even different meanings in different reference materials instead of being uniformly defined only based on atmospheric crude tower cut points of temperature intervals (such as from 190° C. to 250° C. or 180° C. to 230° C. or other evolved standard. For example, EIA defines "Middle distillates: A general classification of refined petroleum products that includes distillate fuel oil and kerosene". Thus, refinery cut points at temperature intervals are dictated by specification for each product from a conventional refinery, which often are set locally and are not defined based on sulfur content. We have found that to be less than optimal.

The term "constituent" is used herein to reflect unexpected phenomena that we found by 'combining constituents' in practice of this invention, versus merely blending ingredients. Typical use of the term "ingredient" when referring to a combination of things by human intervention lends expectation to results by presence of the ingredient. That is, the ingredient, when added, gives an expected physical or chemical property characteristic to the whole.

Conventional refiners do not mix gasoline with diesel, or with treated residual oils to produce a fuel. Instead, cuts are separated for differing engine types.

What is not known to those skilled in the prior refining art until now disclosed by this invention is a novel fuel formulation and how to select and procure or procure from many light (L), middle (M) and heavy (H) constituents (taught and defined hereinafter) and how best to combine the selected constitutes to form a low sulfur, essentially metals free fuel. Such is much akin to a baker looking at a warehouse full of cooking ingredients but not having a recipe for the lowest calorie cake at lowest cost and not knowing that certain surprising interaction phenomena occur by treating ingredients and combining them certain way.

DETAILED DESCRIPTION OF THE INVENTION

Figure 2:
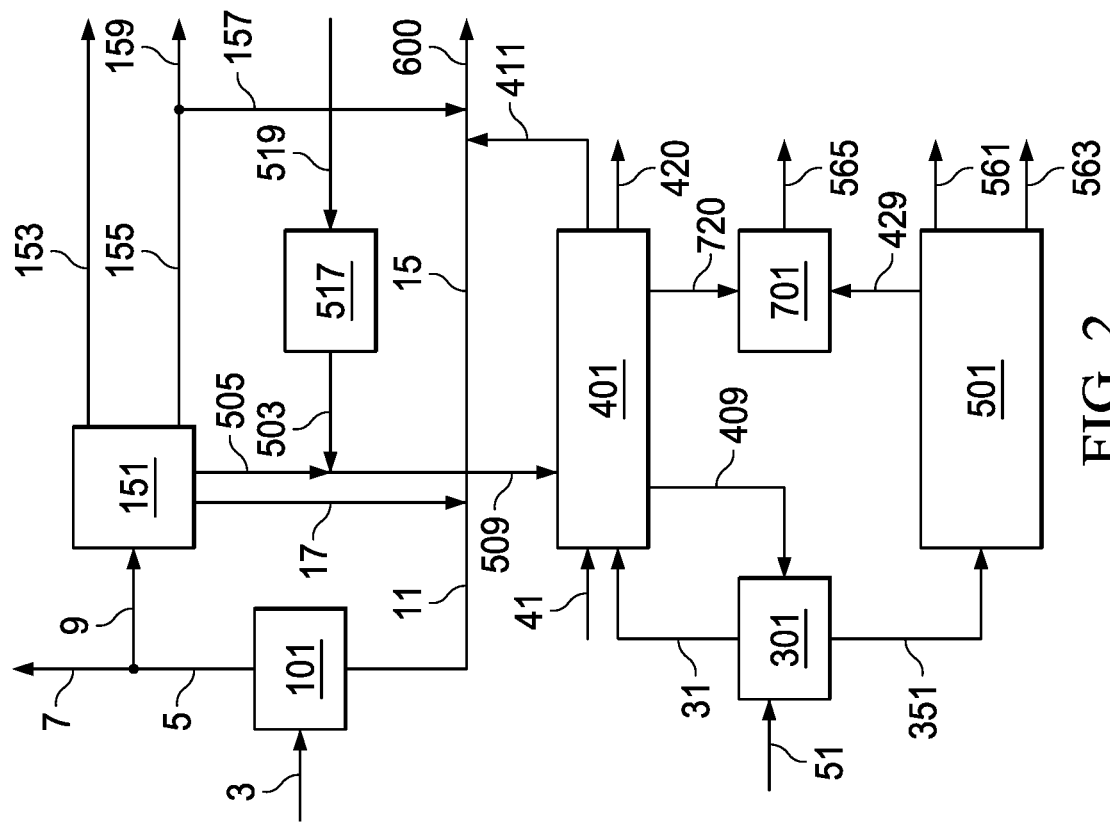
FIG. 2 shows simplified treatment of light cycle oil and high sulfur fuel oil to produce a low sulfur fuel with an adjusted flash point.

This invention provides process for conversion of various hydrocarbonaeous feeds from sources other than conventional crude oils, either alone or combined with conventional feeds, to form a fuel which has wide range of hydrocarbons. In variations, fuels formed by light tight oil feed and high sulfur fuel oil feeds have a wide range of hydrocarbons comprising those from the lowest boiling with said light tight oil forming said fuel up to the maximum boiling point of a hydroconverted liquids derived from high sulfur fuel oil to form said fuel.

In one embodiment, one or more high sulfur fuel oils are fed to a residue hydro-conversion zone and contacted with hydrogen in presence of catalyst at residue hydroconversion conditions in an ebullated-bed reactor to form (1) hydroconversion reactor effluent which is separated into hydroconverted product liquids, purge gases comprising hydrogen and sulfur and (2) unconverted oils which are directed to solvent separation. Such unconverted oil are directed to form (A) soluble deasphalted oil which is recycled as feed to the hydroconversion reactor, either separately or combined with added high sulfur fuel oil feed to said reactor and (B) insoluble pitch which is directed to pitch treatment. The product fuel is formed by combining all or one or more portions of a light tight oil with said hydroconverted product liquids. In one variation, before use as part of the combination, the light tight oil is fractionated to remove overhead still gases to leave fractionator bottoms which are combined with the hydroconversion zone product liquids to form a fuel. In another various, a portion of the feed to the solvent separation includes added high sulfur full oil which is direct added to solvent separation or is combined with hydroconversion reactor unconverted oil for feed to solvent separation. Also, additional high sulfur fuel oil can be combined with said soluble deasphalted oil to serve as a portion of the feed to the hydroconversion reactor. To address flash point and other considerations, the light tight oil can be fractionated, prior to addition to the fuel combination, to remove overhead still gases to form an upper zone lighter fraction comprising naphtha range hydrocarbons and higher boiling bottoms fraction. In one variation, and at least a portion of such lighter fraction is naphtha rich and can be directed to a reformer or other aromatics unit operation, where it is subject to contact with hydrogen under reforming conditions to form a light treated stream. In another variation, all or a portion of said light treated stream, untreated light stream and high boiling bottoms fraction are combined with said hydroconverted liquids to form a fuel. In yet another variation, the effluent from the hydroconversion reactor can be separated by fractionation into more than one treated liquid fractions, at least one of such fractions having a sulfur content above the target sulfur content which is directed as part of the feed to residue hydroconversion reactor or as part of the feed to solvent separation In one embodiment, the residue hydroconversion zone integrates a residue hydroconversion reactor with a heavy oil range hydrotreater and a distillate range hydrotreater, integrating one or more gas and liquid separators, streams of hydrogen, purge gases, sulfur recovery steps and common treated liquids recovery. In another variation such integration is configured to enable separate treated liquids recovery to enable measurement of sulfur content of each separate stream and adjustment of amount of flow to combination zone so as to form a fuel having an actual sulfur content at or below a target sulfur content. In a variation, the treated products stream from the upper zone of the hydroconversion reactor zone effluent can be separated by fractionation into more than one hydroconverted liquid fractions, at least one of such fractions having a sulfur content above the target sulfur content which is directed to a separate hydrotreating zone for contact with hydrogen in presence of catalyst at hydrotreating conditions to form a reduced sulfur hydrotreated stream having a sulfur content less than the target sulfur content, and then such hydrotreated stream is combined with other hydroconverted liquid fractions and with said untreated stream derived from light tight oil to form a fuel having an actual sulfur content at or below a target sulfur content.

In one embodiment, a light tight oil feed has a density API in the range of 45 to 55 degrees and said high sulfur fuel oil has a density API in the range of 14 to 21 degrees, said hydroconverted liquids have a density API in the range of 26 to 30 degrees, and said combination fuel product has a density API in the range of 37 to 43 degrees and a sulfur content of less than 0.5 wt. % sulfur. The actual sulfur content of fuels of this invention can be adjusted, as disclosed herein, to meet target sulfur content within an IMO specification for marine fuel or a turbine manufacturer's specification for a combustion gas turbine.

In another embodiment of this invention, a process for co-processing crude oil with light tight oil and high sulfur fuel oil is provided. We define the "breakpoint", for purposes of the specifications and claims, in reference to an assay of crude, or other determination method, as plotted with % mass or volume of crude as the x-axis, with sulfur content as the y-axis, to be the point at which sulfur content begins to rapidly increase from at or near horizontal, or increases exponentially, in terms of high change rate of rise over per unit run, where delta for the run is change in unit volume of fraction and delta for rise is change in unit of sulfur content and slope is the rise over run. The slope of such rise over run starts from near zero or horizontal, rapidly moves over 0.2 to quickly over 1 moves toward somewhat exponential break out increases in sulfur content, The breakpoint will vary based on crude or other feed to the distillation column. The "breakpoint cut" or "sulfur breakpoint cut, thus addresses a means to determine the split in hydrocarbon containing liquids, which boil above the end point of the range for naphtha, for illustration above the end of range of unstabilized wild straight run naphtha, but below or at the breakpoint, which as noted is the point at which sulfur content begins to rapidly increase, or increases exponentially, in terms of high change rate of rise over per unit run.

We define base "breakpoint cut" or base "sulfur breakpoint cut", for purposes of the specification and claims, to mean, with reference to the sulfur content of a fraction, hydrocarbon containing liquids boiling above the end point of the range for unstabilized wild straight run naphtha but below or at the breakpoint, where such breakpoint is selected so that when a fuel product stream is formed from combination of all untreated streams at or below the breakpoint and all streams above the breakpoint cut selected to be added to such combination, the combination fuel has an actual sulfur content that does not exceed a target sulfur content. In variations, a fuel can be produced in accordance wherein the target sulfur content is the sulfur breakpoint, or is higher or lower than the sulfur breakpoint, and the combination of streams forming the fuel are made efficiently with reference to the breakpoint so that actual sulfur content of said fuel does not exceed the sulfur target.

The hydrocarbonaeous feeds, including crude oils and high sulfur oils that have a relatively high sulfur, nitrogen and metals content are fed to atmospheric and vacuum distillation and separated into (1) light overhead still gases, (2) liquid fractions at or below sulfur breakpoint, (3) fractions above sulfur breakpoint comprising (A) distillate range fractions comprising sulfur, (B) vacuum gas oil range fractions comprising sulfur, and (C) vacuum residue comprising sulfur, and (4) purge gases comprising sulfur, such as small amounts sulfur containing gases from distillation unit still gases, strippers and other unit operation overheads. The liquid fractions at or below the sulfur breakpoint, as untreated liquids, are directed to the combination zone to form at least a portion of the fuel. Distillate range fractions and vacuum gas oil range fractions to distillate and vacuum gas oil hydrotreaters for contact with addition of hydrogen in presence of catalyst at hydrotreating conditions to form one or more hydrotreated liquids which are directed to a combination zone and purge gases comprising sulfur. The vacuum residue is directed to an ebullated residue hydroconversion zone for contact with addition of hydrogen in presence of catalyst at ebullated hydroconversion conditions to form (1) one more treated liquids which are directed to combination zone to form part of the fuel, (2) purge gases comprising sulfur and (3) unconverted oils which are directed to solvent separation to form (A) soluble deasphalted oil which is directed to residue hydroconversion, either alone or combined with vacuum residue, and (B) insoluble pitch which is directed to pitch treatment. The untreated liquids are combined with said treated liquids to form a fuel having an actual sulfur content at or below a target sulfur content. Preferably, at least one of said hydrotreated streams is an ultralow sulfur stream having 10 ppmwt or less of sulfur which is used to adjust, by reduction or addition of the amount of such stream to combination forming the fuel in a manner to control actual sulfur content at or below a target sulfur content.

Variations of processes of this invention enable substantially all hydrocarbon compositions of said crude oil feed that have been separated into fractions to be subsequently recombined to form said fuel which is one liquid fuel product, not multiple hydrocarbon products, except hydrocarbon compositions comprising those within (i) light overhead still gases of distillation, (ii) pitch and (iii) streams for sulfur or metals recovery. The fuels can comprise a combination of hydrocarbons ranging from lowest boiling portion of said untreated liquid fraction from said atmospheric distillation to highest boiling portion of stream recovered from solvent separation and subsequently treated stream in either a hydrotreating or hydroconversion reactor, recovered and combined into said fuel. In one variation, at least one of the hydrotreated steams is an ultralow sulfur stream having less than 10 ppmwt of sulfur, and the untreated fraction has a sulfur content in excess of the target sulfur content and said untreated fraction is used as trim control, by reduction or addition of the amount of such untreated fraction to said combination, to form a fuel having an actual sulfur content at or below a target sulfur content. In another variation, a first hydrotreated stream is a reduced sulfur stream having a sulfur content less than 10 ppmwt of sulfur, and a second hydrotreated fuel fractions is a reduced sulfur stream having a sulfur content in the range of 0.12 to 0.18 wt. % sulfur, and the untreated fraction has a sulfur content in excess of the target sulfur content and either said first hydrotreated stream or second hydrotreated stream, or both, are used as trim control, by reduction or addition of the amount of such steams to said combination, to form a fuel having an actual sulfur content at or below a target sulfur content.

In one variation, the residue hydroconversion and hydrotreating zone comprises a separate distillate hydrotreating reactor, heavy oil hydrotreating reactor and residue hydroconversion reactor, with each reactor forming a separate treated effluent, and each treated effluent is separately directed to a shared wall separator to form a common overhead gas comprising sulfur and one or more separate reduced gas liquid treated effluents associated with each reactor treated effluent which is separately withdrawn from said separator at a rate based upon its respective sulfur content and directed either (a) to said combination with said untreated liquid stream to form a fuel having an actual sulfur content at or below a target sulfur content or (b) to reserve storage for subsequent trim control of fuel sulfur content. In certain variations of processes of this invention, the volume of output product fuel may exceed the total volume of input feeds, where by reasons of volume lift caused, at least in part by hydrogen addition.

These novel processes enable sulfur content of combination fuel to be adjusted to meet a target sulfur content within an IMO specification for marine fuel or a turbine manufacturer's specification for a combustion gas turbine. Thus, the fuels are particularly useful in marine or land based engines, combustion gas turbines, or fired heaters. Certain fuel variations derived from combining light tight oil and processed high sulfur fuel oil, wherein the high sulfur fuel oil is processed by residue hydroconversion, produce a fuel having an actual sulfur content of 0.5 wt. % or less comprising a range of crude oil derived hydrocarbons from about C5 to about C20 or more, said hydrocarbons having an initial boiling point being the lowest boiling point of any fraction within untreated streams combined in said fuel and highest boiling point being the highest boiling portion of effluent from solvent separation which is subsequently treated, either by hydrotreating or hydroconversion, and is combined to form a portion said fuel.

Figure 1:
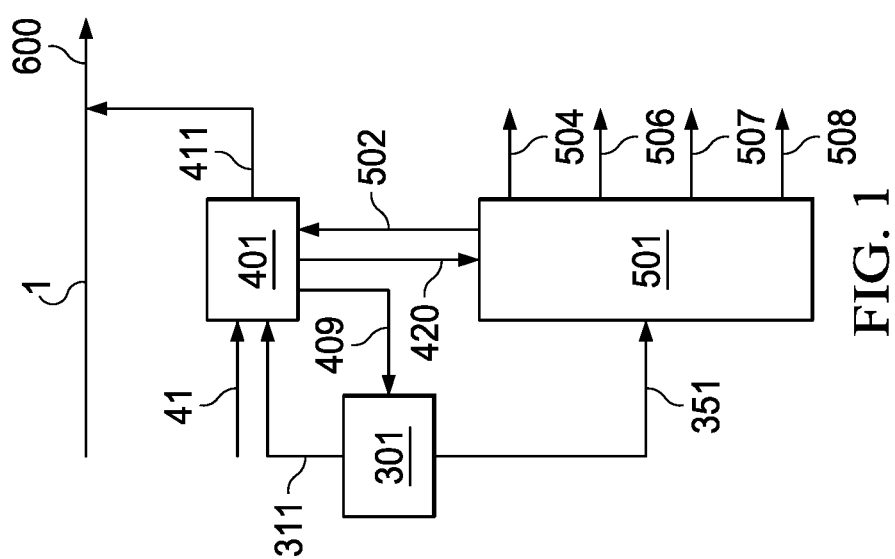
FIG. 1 is a schematic drawing showing basic apparatus and process steps for combining untreated light tight oil with treated high sulfur fuel oil to form a very low sulfur fuel.

FIG. 1 gives a general overview of one embodiment of this invention and shows in simplified form the major components for a process for conversion of hydrocarbonaeous feeds comprising sulfur and metals to form a fuel. A light tight oil feed 1 has preferably been flashed during prior production, shipment or other handling in basic gas/liquid separators to separate light entrained gases or has been subject to stabilization, water and sediment removal or other minor conditioning. The light tight oil feed 1 comprises substantially a lighter and middle range of hydrocarbons having relatively minor amounts of sulfur and metals and relatively little heavy oils and is directed without added treatment to combination zone 600 as an untreated liquid stream. A high sulfur fuel oil comprising sulfur, nitrogen and metals is fed via line 41 to a residue hydroconversion zone 401 for contact of such oil 41 with hydrogen in presence of catalyst at residue hydroconversion conditions in a residue hydroconverter such as an ebullated-bed reactor or other suitable hydroconversion apparatus selected based on feed composition, within zone 401 to form (1) reactor segment effluent which is separated into treated hydroconverted liquids 411 (herein termed "hydroconverted liquids" as type of treated liquids comprising substantially a full range of hydrocarbons from about C5 boiling range up to the minimum boiling point of unconverted oils 409 that are residue from hydroconversion, purge gases 420 comprising purged hydrogen and off gases, components of liquid petroleum gas, and acid gases comprising sulfur, and (2) unconverted oils 409. Such separation is preferably be by a form of vacuum distillation, along in some instances of certain feeds, near atmospheric distillation may be effective to separate the unconverted oils. The unconverted oils 409 are directed to solvent deasphalting in zone 301. Solvent deasphalting separation 301 forms a (A) soluble deasphalted oil 311 which is recycled as feed to hydroconversion reactor in zone 401, either separately or combined with added high sulfur fuel oil feed 41 to said reactor. Solvent deasphalting separation 301 also forms a (B) insoluble pitch 351 which is directed to pitch treatment in the utilities island 501. In the variation shown in FIG. 1, the pitch 351 is directed to a utilities island 501 where the pitch is treated. In this example, the pitch can be fired in one or more gasifiers (not shown) for generation of electricity and of at least a portion of hydrogen for said hydroconversion and for capture at least a portion of said metals in gasifier solids which are removed.

The untreated liquids of line 1 are combined with said treated liquids 411 to form a fuel in combination zone 600. The fuel 600 thus form has combined the (i) lighter and middle range hydrocarbons of the light tight oil feed, condensate or other light feed 1 with many of the (ii) heavier range of hydrocarbons of the high sulfur fuel oil 41 found with treated liquid effluents 411 of hydroconversion zone 401, which fuel 600 has wide range of hydrocarbons comprising those from C5 to C20 or higher. The fuel so formed has a wide range of hydrocarbons comprising those from the lowest boiling with said light tight oil forming said fuel up to the maximum boiling point of hydrocarbons in line 311 that are soluble in solvent separation 301 and are subsequent treated with hydrogen in zone 401 and form part of the effluent 411 to form said fuel. The amount and flowrates of components 1 and 411 can be adjusted, based on their respect sulfur content, so that the fuel 600 has an actual sulfur content at or below a target sulfur content. For illustration, not limitation, if stream 1 is found to have an elevated sulfur content at an unacceptable level that makes it unusable for combining in zone 600, the untreated stream 1 can be fractionated (fractionator not shown), and any higher sulfur heavy bottoms portion can be directed to an integrated hydrotreater within zone 401 for treatment and the other portion of stream 1 can remain untreated and passed to combination zone 600. However, higher sulfur cuts resulting from processing upstream of the hydroconverter, such as an atmospheric distillation bottoms, would not be sent to hydroconversion as part of stream 41 since it will hydrocrack at hydroconversion conditions, unnecessarily consuming hydrogen, and yielding lighter materials found originally within the light tight oil feed. Such higher sulfur cuts instead would be directed to a separate hydrotreating zone as illustrated by next variation. In this variation, treated product zone effluents of one or more reactor within 401 can separated by fractionation, into more than one hydroconverted liquid fractions, and if at least one of such fractions has a sulfur content above the target sulfur content, such fraction or fractions can be directed, either alone or with other similar sulfur content and boiling range streams from outside zone 401 to one or more separate hydrotreating zones within zone 401 for contact with hydrogen in presence of catalyst at hydrotreating conditions to form a hydrotreated stream having a reduced sulfur content, preferably in the range of 0.5 wt. % or less, or more preferably to 0.2 wt. % or less and said reduced sulfur hydrotreated stream is combined with said untreated stream derived from light tight oil or streams remaining from fractionating or other treatment of light tight oil, to form a fuel having an actual sulfur content at or below a target sulfur content. In one variation, series or integrated hydrotreaters produce sulfur content at 10 ppmwt or less to 0.1 wt %, depending on amount of ultralow or low sulfur treated liquid needed for combination stream to have a sulfur content at or below its target sulfur content.

In the residue hydroconversion system 401 variation shown by FIG. 1, make-up hydrogen containing gas 502 from utilities island 501 gasification system in quantities required for hydroconversion, along within internal recycle hydrogen within the residue hydroconversion block 401, is compressed and heated to effective operating temperatures, pressures, space velocities and pressures, which are adjusted based upon catalyst selected and other conditions as known in the art to achieve desired level of hydroconversion. The effluent of the zone 401reactor comprising treated liquids and a hydrogen containing gas are separated in a high pressure separator (not shown), with such liquids being collected within zone 401, and may directed optionally to fractionation, and the hydrogen containing is recovered. Purge gases comprising sour and acid gases are directed via line 420 to utilities island 501 comprising pitch treatment and sulfur recovery systems. Pitch treatment can include firing, either alone or with a diluent, in one or more boilers, for generation of electricity and steam, and optionally having ancillary facilities to reduce or remove sulfur and metal from flue gases and other process gases and a hydrogen generation unit with a pressure swing absorption unit. In another variation, pitch treatment is by transfer for asphalt production or use as coker feed for green coke production. In yet another variation, the pitch is fired in one or more gasifiers for generation of electricity and at least a portion of hydrogen for hydroconversion or hydrotreating and for capture at least a portion of said metals in gasifier solids for metal removal via such solids. The optimal selection of how to handle the pitch will depend on the amount of pitch generated, the availability of low cost hydrogen source, and the potential outlets for the pitch.

Not shown in FIG. 1, but known to those skilled in the hydroconversion art, are various ancillary high, medium and low pressure gas-liquid separators, stream heaters, gas recycle and purge lines, reflux drums for gases or lights and liquid separation, compressors, cooling systems, and other ancillary application. Also, various amine or other sulfur recovery agent absorbers and stripping systems for sour gas or acid gas treatment would be included in hydroconversion zone 401 if not located within a common utilities island 501.

Parameters for selection of residue hydroconversion catalyst and adjustment of process conditions of residue hydroconversion zone 401 are within the skill of a person engaged in the petroleum refining industry and should not require additional explanation for practice of the residue hydroconversion segments of this invention. In the reaction zones, the residue hydroconversion catalysts employed include any catalyst composition useful catalyze the hydroconversion of a heavy hydrocarbon feed to increase its hydrogen content and/or remove sulfur, nitrogen, oxygen, phosphorus, conradson carbon and metal heteroatom contaminants. Specific catalyst types and various support and particle size configurations used and residue hydroconversion conditions selected will depend on the hydrocarbon feed composition, as well as sulfur and metals content and heavy carbon residue, of the each of the other feeds from recycle or other streams and the desired reduced sulfur and metals content of the product stream from the reactor. Such catalyst may be selected from any catalyst useful for the residue hydroconversion of a hydrocarbon feedstock. Publication number US20140221713A1 (U.S. Ser. No. 13/758,429) 2014 by Baldassari et al, which is incorporated herein by reference describes a wide range of various suitable residue hydroconversion catalyst as well suitable residue hydroconversion processes including variations of integrated residue hydroconversion apparatus. Baldassari et al further summaries variations of catalyst compositions and condition ranges for distillate and heavy oil residue hydroconversion and distinguish over hydroconversion conditions, all of which are known those skilled in the art of residue hydroconversion. In one preferred embodiment of this invention, the ebullated bed hydroconversion is carried out at a reaction temperature range from 380° C. to 450° C. and a reaction pressure in the range of from 70 bar to 170 bar (hydrogen partial pressure), with preferred liquid hourly space velocities in the range of 0.2 to 2.0 hr-1, and conversion to 550° C. minus would be in the range of thirty percent (30%) to eighty percent (80%).

In another preferred variation, the pitch 351 is fed to an integrated gasification-combined cycle system 501 comprising one or more gasifiers for partial oxidation of said pitch 351 in presence of steam and oxygen and optionally carbon containing slurry quench, to form syngas, at least a portion of which is converted to hydrogen which is directed via line 502 for use in hydroconversion system 401 and syngas for firing a gas turbine of a combined cycle power unit within the utilities island system 501 for electrical generation within 504 for process uses and other uses, as well as forming hot turbine gases, and also comprising a heat recovery generator to recover heat from such hot gas turbine gases to produce steam extracted via line 507 internal process use or to drive a steam turbine, for additional electricity generation directed as power via 504. Each gasifier also produces metals rich soot, which may be in the form of particulate solids, which comprises metal contaminants derived from the high sulfur fuel oil and/or other heavy feeds, which solids are directed via line 506 from each gasifier for metals removal. Support systems comprise one or more gas treatment units to which all sulfur containing gas streams, whether sour gas or acid gas, from all unit operations are fed for sulfur removal via 508. Preferably such sulfur removal systems are part of the utilities island of which the gasification system is part. More preferably, one or more sulfur containing gas streams are directed to commercial sulfur acid production as part of overall sulfur removal. The gasification system within utilities zone 501 will typically include acid gas removal unit and sour CO-shift system that are optimized in capacity and configuration to produce the required hydrogen from at least a part of the raw syngas produced within the gasification system.

In the embodiment of a process of this invention shown in FIG. 2, a liquid stream 411 resulting from high sulfur fuel oil feed 41 is combined with a liquid stream 15 resulting from light tight oil feed 3 at combination zone 600 to produce a fuel having an actual sulfur content at or below a sulfur content target.

A light tight oil enters the process at line 3 and is directed to a fractionator 101 where the feed 3 is separated into at least two fractions: (a) upper zone cut 5 which comprises at least a portion of the naphtha range hydrocarbons within light tight oil feed 3 and all of the lighter lower range hydrocarbons and (b) a bottoms, comprising substantially that which in not within (a). Fractionator 101 bottoms 11 is directed via lines 11 and 15 to combination zone 600 to form a portion of the product fuel. The upper zone naphtha and lower cut 5 comprises (i) light still gases which are flashed in a separator (not shown) and passed via line 7 for internal use as process fuel or capture for other uses and (ii) stream 9 which is primarily naphtha range hydrocarbons. After removal of light gases, all or part of stream 9 can either be sent (via lines 9 and 17, connector not shown) directly to line 15 for direct combination to form a portion of the fuel at zone 600, or taking into consideration flash point of the combination 600, at least low flash portion of stream 9 can be passed to a processing unit 151, such as a conventional aromatics complex having a catalytic reformer well known in the refining art, wherein stream 9 is contacted with catalyst in unit 151 to produce byproduct hydrogen 505 and a light treated stream 155 recovered via line 159 for non-fuel or other uses. Unit 151 may produce useful byproducts, for example, liquid petroleum gas 153 which can be used internally for process fuel or captured for other uses.

In FIG. 2, a high sulfur fuel oil, either alone or with another heavy residual or extra heavy crude, enters the process via line 41 and is directed to a residue hydroconversion zone 401 to produce a very low sulfur liquid stream 41. As discussed with FIG. 1 above, parameters for selection of residue hydroconversion apparatus and catalyst and adjustment of various process conditions within an integrated residue hydroconversion zone 401 are within the skill of a person engaged in the petroleum refining industry and should not require detailed explanation for practice of the residue hydroconversion segments of this invention. In variations of this embodiment as shown, the integrated zone 401 comprises a hydroconversion reactor to which the high sulfur fuel oil and other heavy feeds within 41 are directed. Such heavy feeds 41 are preferably treated in residue hydroconversion zone 401 having an ebullated-bed reactor within zone 401 to form (1) reactor segment effluent which is separated into treated liquids 411, purge gases 420 comprising hydrogen and sulfur and (2) unconverted oils 409. The unconverted oils 409 are directed to solvent separation 301. Solvent separation 301 forms a (A) soluble deasphalted oil 31 which is recycled as feed to said reactor 401, either separately or combined with added high sulfur fuel oil feed 51 to said solvent separation zone 301. Solvent separation 301 also forms a (B) substantially insoluble metals rich pitch 351 which the embodiment shown in FIG. 2 is directed to pitch treatment.

Figure 3:
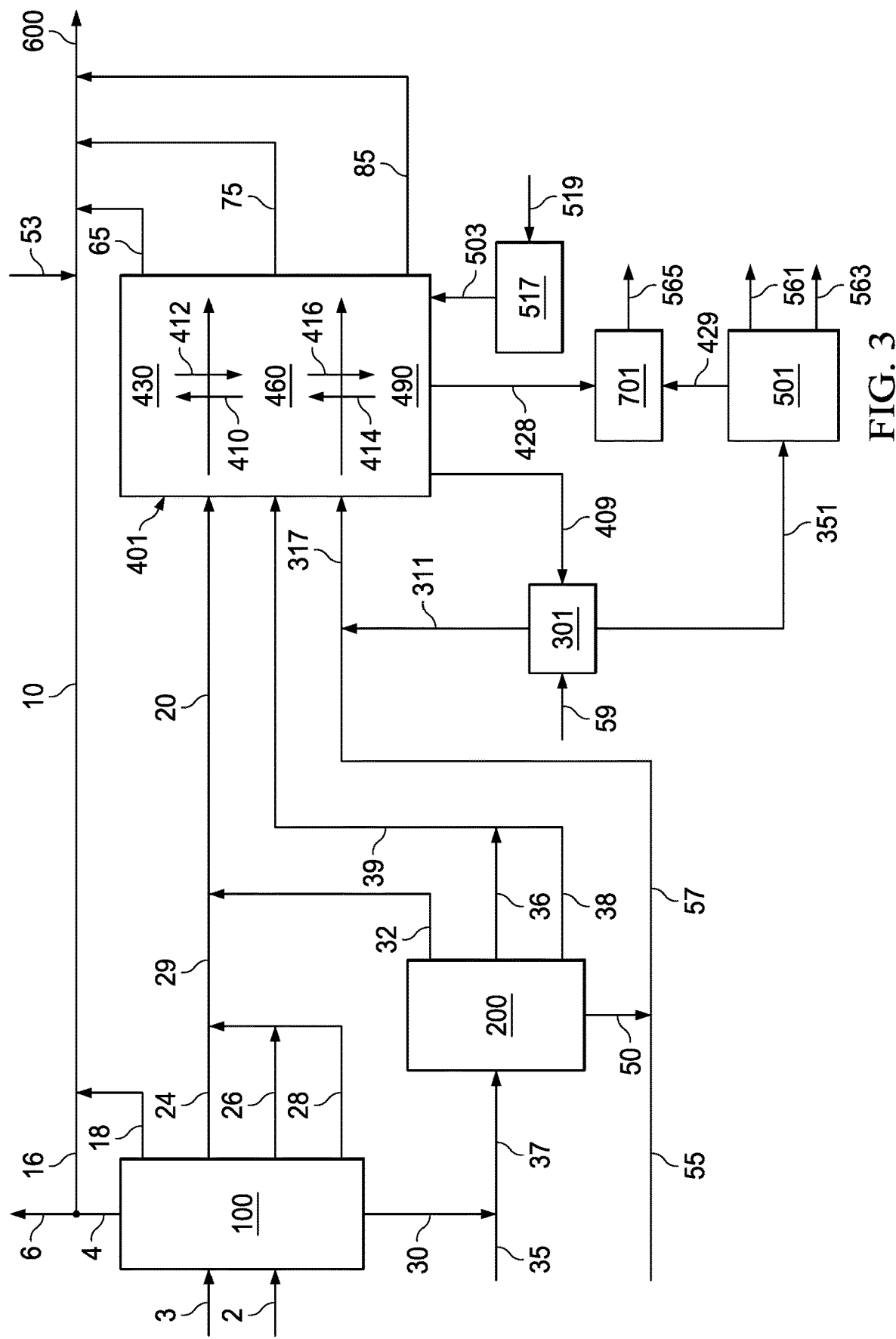
FIG. 3 is a schematic drawing showing apparatus arrangement and process steps for use of crude oil either alone or with light tight oil and high sulfur fuel oil to produce ultraclean fuels having very low sulfur, nitrogen and metals

In the utilities variation shown in FIG. 3, the pitch 351 is directed to a boiler where the pitch is fired to generate steam for steam turbine generation of electricity 561, wherein at least a portion of the boiler flue flue gases 429 are treated in zone 701, either separately or with zone 401 acid gases 420 within purge and other gas streams from hydroconversion zone 401, for example, via various amine or other sulfur recovery agent absorbers and stripping systems for sour gas or acid gas for sulfur capture and removal via line 565 and, in variations, separate systems for metals capture and removal via line 563. Not shown in FIG. 2, but known to those skilled in the hydroconversion and hydrotreating art, are various ancillary high, medium and low pressure gas-liquid separators, stream heaters, gas recycle and purge lines, reflux drums for gases or lights and liquid separation, compressors, cooling systems, and other ancillary apparatus. In the variation shown, in addition to optional byproduct hydrogen 505 from process unit 151, other make-up hydrogen supply to zone 401 is via lines 503 and 509 from hydrogen generation unit 517 having a hydrogen source 519, for illustration, not limitation, a natural gas fed steam cracker with a pressure swing absorption unit, which cracker may be able to use at least a portion of the boiler steam from utilities zone 501 as discussed later.

The combined heavy residue feeds to hydroconversion reactor zone 401 are directed in contact with hydrogen in presence of catalyst at residue hydroconversion conditions in an ebullated-bed reactor within zone 401 to form (1) reactor segment effluent which is separated into treated liquids 411, a portion of purge gases 420 comprising hydrogen and sulfur and (2) unconverted oils 409. Also, various amine or other sulfur recovery agent absorbers and stripping systems for sour gas or acid gas treatment would be included either in hydroconversion zone 401 or separate sulfur recovery zone 701 to which high sulfur purge gases 428 would be directed. The treated steam 411 is directed to combination zone 600 to be combined with untreated stream 15 form the product fuel in a manner whereby the combination is made so that the actual sulfur content of the fuel product is at or below the target sulfur content.

In the embodiment of a process of this invention shown in FIG. 3, a stream of contaminated crude oil comprising sulfur, nitrogen and metals enters the process via line 2 after pretreatment such as desalting, which is preferred for crude oil. In this example, the crude feed 2 can be a single crude oil or blends of one or more crude oils or a blend of a crude oil with, or a separate feed of either a light tight oil or a residual oil such as high sulfur fuel oil or both. In the variation shown, a crude feed 2 and a light tight oil feed 3 are separately directed to an atmospheric distillation column 100, preferably in a manner whereby the light tight oil 3 is fed at or near the upper portion of the crude 2 feed flash zone of column 100 where the feeds are separated into light overhead gases 4 and multiple cuts. The light overhead gases 4 include non-condensable still gases 6 useful as process fuels or can be captured for other uses. In one preferred variation, capital expenditures associated with a stabilization system are avoided with respect such overhead gases 4; however, depending on local needs, for example a special marine fuel maximum H2S specification, a stabilization system can be included.

In the embodiment shown in FIG. 3, the multiple cuts would include one or more of streams within these ranges (1) unstabilized wild straight run naphtha via line 4 at line 16, (2) sulfur breakpoint cut at line 18, (3) light distillate at line 24, (4) medium distillate at line 26, (5) a first heavy distillate at line 28, (6) atmospheric residual at line 30. Preferably, the combination sulfur break point of steams (1) unstabilized wild straight run naphtha via line 4 at line 16 and (2) sulfur breakpoint cut at line 18 would contain in the range of less than 0.06 wt. % sulfur to 0.08 wt. % sulfur if the fuel combination at 600 target sulfur content is 0.1 wt % or less sulfur and treated streams sulfur content is less than 10 ppmwt, where flow rates of untreated steams 10 and treated streams 65, 75, and 85 to the combination are adjusted so that the fuel combination 600 does not exceed target sulfur content. In a variation, an untreated low sulfur, low metals light tight oil stream is fed via line 53 directly to combination 600 in addition to the combination of lines 10, 65, 75, and 85 to adjust final sulfur content and other parameters of combination zone 600.

In FIG. 3, the atmospheric residual is directed via line 37, either alone or with added residual oil feed 35 such as high sulfur fuel oil, to a vacuum distillation tower 200 to produce (1) a second heavy distillate at line 32, (2) light vacuum gas oil at line 36, (3) heavy vacuum gas oil at line 38 and (4) vacuum residual at line 50. The vacuum residual 50 is directed via lines 57 and 317, either alone or with added residual oil 55 such as high sulfur fuel oil to the an integrated residue hydroconversion and hydrotreating zone 401.

Parameters for selection of integrated residue hydroconversion and hydrotreating apparatus and catalyst and adjustment of various process conditions within an integrated residue hydroconversion and hydrotreating zone 401 are within the skill of a person engaged in the petroleum refining industry and should not require detailed explanation for practice of the residue hydroconversion and hydrotreating segments of this invention. In variations of this embodiment as shown, the integrated zone 401 comprises a (A) hydroconversion reactor zone 490 to which the heaviest, most contaminated feeds are fed via lines 57 and 317 such as vacuum residue 50 and added high sulfur fuel oil and other heavy feeds via line 55, (B) a heavy oil hydrotreating reactor zone 460 to which heaviest distillates and gas oils are fed via line 39, such as shown those comprising (1) light vacuum gas oil at line 36, and (2) heavy vacuum gas oil at line 38, and can also be fed vacuum oils separated within zone 410 from hydroconversion reactor effluent, for example, by vacuum distillation of reactor liquid product stream, (C) a distillate hydrotreating reactor zone 430 to which the lighter, less contaminated feeds are fed via line 20, such as line 29 comprising (1) light distillate at line 24, (2) medium distillate at line 26, (3) a first heavy distillate at line 28 and line 32 comprising (4) second heavy distillate and can also be fed distillate range materials separated within zone 401 from hydroconversion reactor effluent. For example, the second heavy distillate at line 32 can be alternatively directed to the heavy oil hydrotreater 460 depending on line 32 composition and needs to balance the loads on hydrotreater reactors within zones 430 and 460 and control sulfur content levels. In such integrated residue hydroconversion and hydrotreating zone 401, recycle and make-up hydrogen streams 410 and 414 and purge gas streams 412 and 416 have integrated recycle, separation and removal systems known to those skilled in the refining art. Not shown in FIG. 3, but known to those skilled in the hydroconversion and hydrotreating art, are various ancillary high, medium and low pressure gas-liquid separators, stream heaters, gas recycle and purge lines, reflux drums for gases or lights and liquid separation, compressors, cooling systems, and other ancillary apparatus. In the variation shown, hydrogen supply 503 is from hydrogen generation unit 517 having a hydrogen source 519, for illustration, not limitation, a natural gas fed steam cracker with a pressure swing absorption unit, which cracker may be able to use at least a portion of the boiler steam from utilities zone 501 as discussed later.

The combined heavy residue feeds 317 to hydroconversion reactor zone 490 are directed in contact with hydrogen in presence of catalyst at residue hydroconversion conditions in an ebullated-bed reactor within zone 401 to form (1) reactor segment effluent which is separated, preferably by a second vacuum distillation unit (not shown) into (1) treated liquids 85 comprising (i) naphtha, (ii) middle distillates and (iii) vacuum gas oils, a portion of purge gases 416 and 428 comprising hydrogen and sulfur and (2) unconverted oils 409. Also, various amine or other sulfur recovery agent absorbers and stripping systems for sour gas or acid gas treatment would be included either in hydroconversion zone 401 or separate sulfur recovery zone 701 to which high sulfur purge gases 428 would be directed, At least a portion of the used catalyst from hydroconversion reactor 490 ebullated bed, comprising metals and/or other contaminants deposited thereon or other accumulated with the catalyst during processing within the ebullated bed of the reactor 490 is withdrawn via line 421 and replaced by makeup catalyst via line 423, as is known in the art. In one variation, the treated liquids 85 comprising (i) naphtha, (ii) middle distillates and (iii) vacuum gas oils are fractionated and the middle distillates are directed to the distillate hydrotreater 430 and the vacuum gas oils are directed to the heavy oil hydrotreater 460.

The hydroconversion unconverted oils 409 are directed to solvent separation 301. Solvent separation 301 forms a (A) soluble deasphalted oil 311 which is fed to said hydroconversion reactor 490 or in another variation to zone 460, either separately or combined with vacuum residual 50, with added high sulfur fuel oil feed 55, if any, via lines 57 and 317 to said hydroconversion reactor 490. Solvent separation 301 also forms a (B) insoluble metals rich pitch 351 which is directed to pitch treatment in the utilities island 501. In the utilities variation shown in FIG. 3, the pitch 351 is directed to a boiler where the pitch fired to generate steam for steam turbine generation of electricity 504, wherein at least a portion of the boiler flue flue gases 429 are treated in zone 701, either separately or with zone 401 acid gases 428, for example, via various amine or other sulfur recovery agent absorbers and stripping systems for sour gas or acid gas for sulfur capture and removal via line 561 and separate systems for metals capture and removal via line 563.

In the variation shown in FIG. 3, the fuel product 600 sulfur content is controlled to be at or below a target sulfur content limit level by (a) feeding to the combination 600 unstabilized wild straight run naphtha 16 and sulfur breakpoint cut 18, without added treatment of either such stream, via line 10, then (b) adjusting actual product sulfur level 600 by increasing or decreasing amounts to the combination of one or more of any of (1) streams of light distillate 24, medium distillate 26, first heavy distillate 28, and second heavy distillate 32 or adding or reducing middle distillates within hydroconverter reactor effluent formed within the integrated zone 401 to the distillate hydrotreater zone 430, or (2) stream 39 comprising light vacuum gas oil 36 and heavy vacuum gas oil 38 or adding or reducing hydroconverter effluent vacuum gas oils (not shown) formed within integrated hydroconversion (401) to heavy oil hydrotreater 460, and (c) then decreasing amounts to the combination 600 of one or more of any of (1) streams from distillate hydrotreater zone 430 via line 65 which was formed from light distillate 24, medium distillate 26, first heavy distillate 28 and/or second heavy distillate 32, and optionally hydroconverter effluent middle distillates (2) streams from heavy oil hydrotreater zone 460 via line 75 which was formed from light vacuum gas oil 36, heavy vacuum gas oil 38 and optionally hydroconverter effluent vacuum gas oils or (3) naphtha and other treated liquid effluent 85 form hydroconversion reaction zone 490, if any or all of such needed for any reason to increase the actual product 600 sulfur level to the target sulfur level, or (d) increasing amounts to the combination of one or more of any of (1) said streams from distillate hydrotreater 430 via line 65 or (2) streams from heavy oil hydrotreater 460 via line or (3) treated stream from hydroconversion reaction via line 85, if needed for any reason to decrease the actual product 600 sulfur content at or below the target sulfur content limit level. Multiple sulfur grades can be efficiency produced due to such facilitation, for example those fueled targeted for 500 ppmwt sulfur fuel or lower for marine and land based gas turbines or differing ranges for the same applications at different end-user locations requiring different target sulfur contents.

In variations for use of high sulfur fuel oil having a sulfur content greater than the target sulfur content limit level of finished fuel at combination 600, the high sulfur fuel oil is fed as part of one or more of the various feeds to one or more of each unit operation. Depending on its sulfur content, high sulfur fuel oil can be added to (a) feed line 2 to atmospheric distillation 100 or line 30 via line 35 to vacuum distillation 200, or (b) via lines 55, 57, and 317 to residue hydroconversion reactor 490, or (c) added to line 20 to distillate hydrotreater 430, either separately or combined with one or more of light distillate 24, medium distillate 26, first heavy distillate 26 or second heavy distillate 32 feeds to said distillate hydrotreater 430, or (d) line 39 to heavy oil hydrotreater 460, either separately or combined with one or more of light vacuum gas oil 36 or heavy vacuum gas oil 38 or (e) via line 59 to solvent separation zone 301, to form a fuel combination 600 having an actual sulfur content at or below a target sulfur content limit level.

In another variation, a clean fuel at combination 600 zone is formed by adding a high sulfur fuel oil, which can have a sulfur content greater than the target sulfur content limit to one or more of (a) stream 10 formed from unstabilized wild straight run naphtha 16 and sulfur breakpoint cut 18 without added treatment, depending on sulfur content of high sulfur fuel oil or is added to (b) stream 65 formed from distillate hydrotreater 430 comprising wild naphtha and ultra low sulfur diesel range materials, or (c) stream 75 formed from heavy oil hydrotreater 460 comprising wild naphtha, ultra low sulfur diesel and a second reduced sulfur stream or (d) treated effluent 85 from hydroconversion reactor 85, and adjusting process conditions and sulfur contents of flows of each treated stream 65, 75 and 85 so that the fuel 600 has an actual sulfur content at or below a target sulfur content limit level, taking into consideration the sulfur content, if any, of untreated steam 10.

In one preferred variation of use of a high sulfur fuel oil in making fuel composition 600, the sulfur content of such high sulfur fuel oil is determined, then the high sulfur fuel oil is either fed as part of the feeds 55 and 59 to one or more of the solvent separation unit 301 or the residue hydrocarbon reaction zone 490, as determined by sulfur content of the high sulfur fuel oil to optimize adjustment of hydroconversion conditions in zone 490 to tailor sulfur content of treated liquid effluent 85 for forming a fuel in zone 600 having an actual sulfur content at or below a target sulfur content limit level.

The flowsheets of FIG. 1, FIG. 2 and FIG. 3 showing various intermediate individual products are for illustration and understanding of the main products and byproducts at effluents of each unit operation depicted. A selected variation of separation or treatment by each unit operation depends on crude and feeds selected and optimization of intermediates produced to produce fuel at or below target sulfur specification. For example, separate treated effluents 65, 75 and 85 shown in FIG. 3 from hydrotreaters 430 and 460 and hydroconversion reactor 490 can be combined within integrated zone 401 by use of a common gas-liquid separator (not shown), for example if ultralow diesel produced in hydrotreated 430 is not separated from higher sulfur content hydrotreated materials produced in hydrotreater 460 or hydroconversion reactor 490 and all treated materials 65, 75 and 85 are combined and directed as one stream to combination zone 600. As noted, parameters for adjustment of various process conditions within an integrated residue hydroconversion and hydrotreating zone 401 are within the skill of a person engaged in the petroleum refining industry; for illustration, hydroconversion and hydrotreating conditions will be adjusted to less severe to avoid cracking when fewer light ends are wanted in the mix and adjusted to more severe if less heavy ends are wanted.

Figure 4:
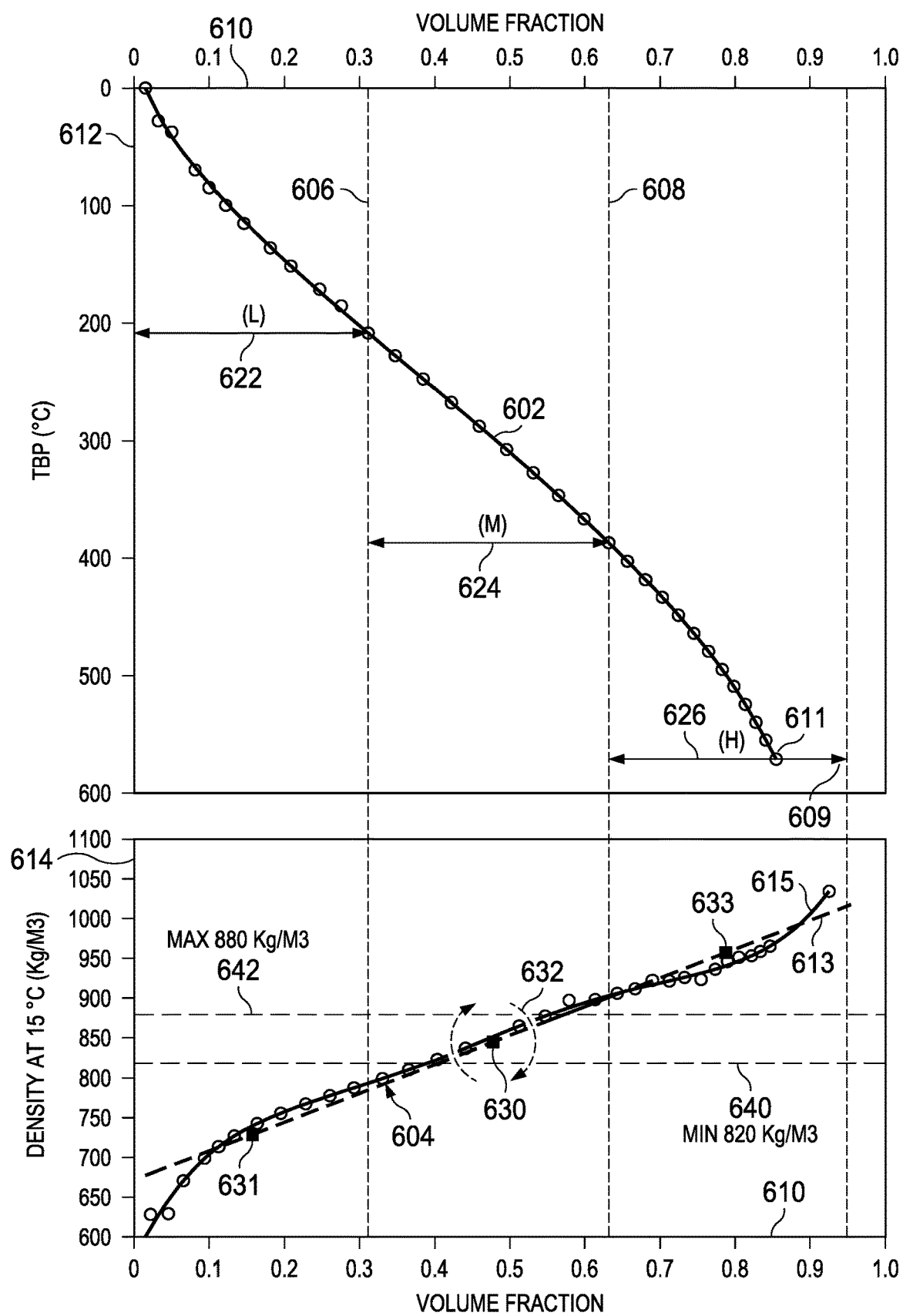
FIG. 4 is a schematic drawing showing volume fraction and density profile of reference fuel produced by a process of this invention, and its (L), (M) and (H) ranges.

FIG. 4 plots both temperature and density profile against volume fraction for a reference fuel produced by a process of this invention and shows its (L), (M) and (H) ranges, identified as taught herein.

Figure 5:
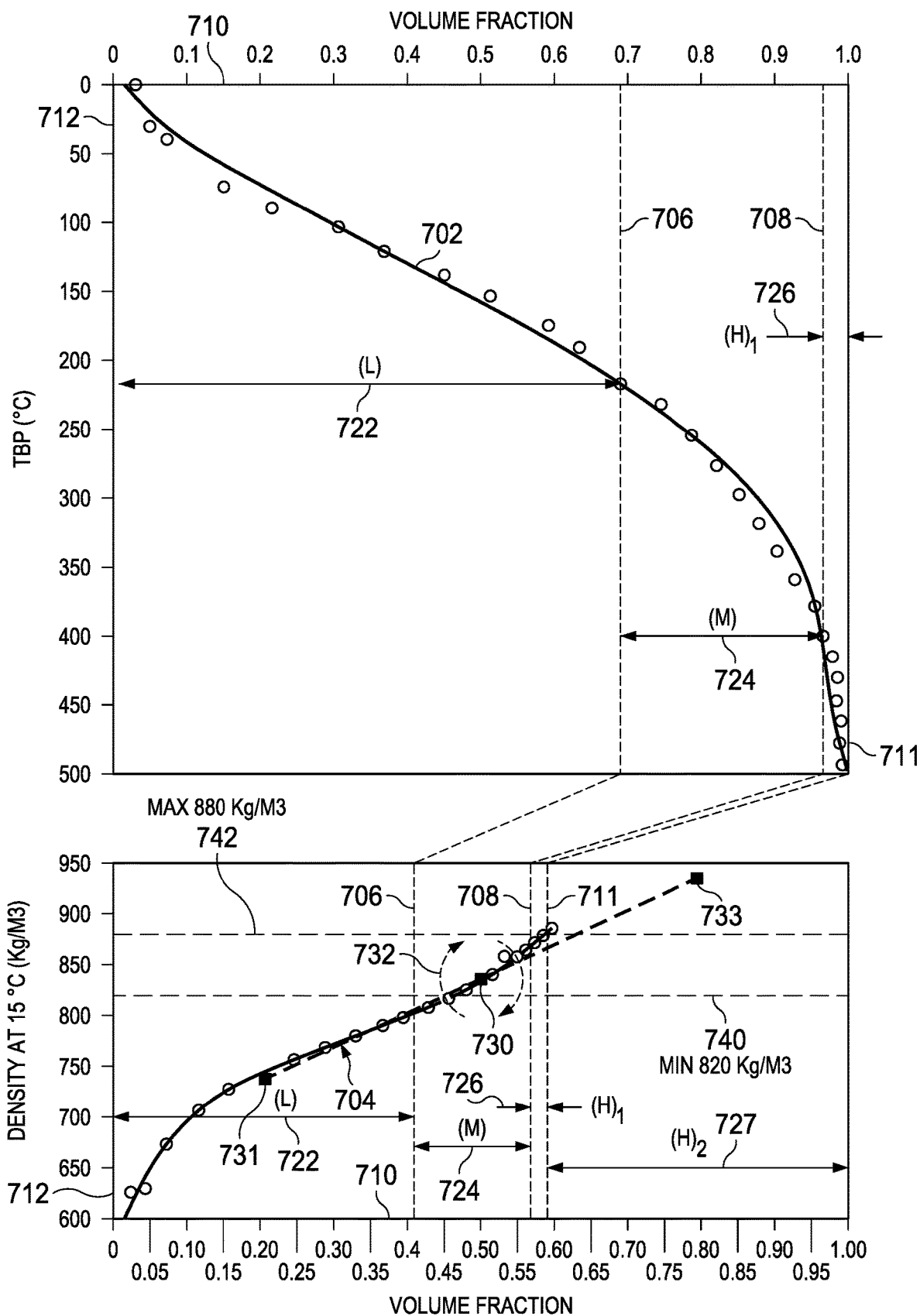
FIG. 5 shows volume fraction and density profile of a reference light condensate which can used as a 'top of the barrel' (having naturally occurring majority of (L) Constituents minor naturally occurring (M) and (H), which is combined with added (H) from another source such as a 'bottom of the barrel' (H) constitute, to formulate a fuel of this invention.

FIG. 5 shows temperature and density profile against volume fraction of a reference light condensate that can be used as a 'top of the barrel' for a combination. That is, such condensate contains naturally occurring majority of (L) constituents with a minor amount of naturally occurring (M) and little (H)1. The selected condensate, which when combined with added (H)2 from another source such as a 'bottom of the barrel' (H), to formulate a fuel of this invention.

An essential requirement is that fuels of this invention when formed by combining a range of hydrocarbons constituents of (L)+(M)+(H), the resulting combination is determined, based on 100 volume percent total, as follows:

(a) $(L)\% + (M)\% + (H)\% = 100\%$ and (b) $(L)\% = (H)\% = (100\% - (M)\%)/2$ and (c) if (M)% is zero or otherwise less than 100%, the remainder is (L)%/(H)% in ratio of 0.4/1 to 0.6/1, and such combination has the following properties: (1) density within 820 to 880 Kg/M3 at 15° C., (2) sulfur content of 0.25 wt. % or less and (3) metals content of 40 ppmwt or less. Lower sulfur and metals are preferred as herein set forth.

To enable one skilled in the refining art to know first how to select what to combine according to the recipe of this invention, potential components of (L), (M) and (H) are initially summarized by points of industry composition reference, then narrowed by limitations of the requirements set forth above and below.

For illustration, with respect to components of "(L)" or "Light Constituent" range, certain components may be within variations found in a refining 'warehouse' of local available materials and others may need manufacture if not locally available. Subject to requirements herein, prospective (L) can include components of naphtha and kerosene range materials but not all, for illustration, due to sulfur and density requirements for the fuel combination. As used in the specification and claims, (L) means full range naphtha, having an initial boiling point of 38° C. (100° F.) or less having a ninety percent (90%) plus final boiling point of 190° C. (374° F.) to about 205° C. (401° F.). (L) can be (a) refined or partially refined, (b) unrefined or (c) extracted and used without being subject to any fractionation, hydrotreating or other treatment process, except optional separation of light gases or water. For example, certain components of (L) or precursors of (L) are publicly listed via Platts, an industry offering system; however, offered range materials are not based on sulfur breakpoint, as breakpoint is novel and requires consideration of treatment of materials to be added to the combination or low sulfur alternatives. Thus, the component descriptions below are guides as to where to look.

Such prospective components of (L) also include, but are not limited to, those within EIA assigned definitions (with degrees F. to C. conversions in brackets) of (i) "Naphtha: A generic term applied to a refined or partially refined petroleum fraction with an approximate boiling range between [50° C. to 204.5° C.](122° F. and 401° F.)." and (ii) "Naphthas: Refined or partly refined light distillates with an approximate boiling point range between [50° C. to 204.5° C.](122° F. and 401° F.). Blended further or mixed with other materials, they make high-grade motor gasoline or jet fuel. Also, used as solvents, petrochemical feedstocks or as raw materials for the production of town gas. Thus, when practicing the teaching of this invention, producing or procuring one or more suitable (L) or Light Constituents, or procuring starting materials to manufacture such constituents, are known to those skilled in the refining art subject to the requirements herein taught. For example, (L) Constitute preferably has a sulfur content below or at or near the breakpoint; however sulfur content may be more than breakpoint where the sulfur content of (M) and (H) when combined allow the combination to not exceed the fuel sulfur limit. It is preferred that the (L) heavier portion range end at the sulfur breakpoint for the crude from which it was produced.

Prospective components of "(M)" or "Middle Constituent" range as used herein means a refined or partially refined petroleum fraction with an approximate boiling range between having initial boiling point of about 190° C. (374° F.) to about 205° C. (401° F.) a 90% plus final boiling point of about 385° C. (725° F.) to 410° C. (770° F.), all subject to requirements herein; however, it is preferred that the lighter portion range of (M) begins at the sulfur breakpoint for the crude from which it was produced. Components of (M) can include bottoms portions of light tight oils heavier than naphtha range. In preferred variations, starting components of (M) comprises a middle distillate combination of about one third kerosene range and about two thirds diesel range hydrocarbons, subject to other limitations herein and has a density in the range of 820 to 880 Kg/M3 at 15° C., per ASTM D4052.

When practicing the teaching of this invention, producing or procuring one or more suitable components of (M) or Middle Constituents are known to those skilled in the refining art, subject to requirements herein taught. In many variations found in the refining 'warehouse' of available materials, (M) includes, but is not limited to, EIA assigned definitions (with degrees F. to C. conversions in brackets) of (i) "Middle distillates: A general classification of refined petroleum products that includes distillate fuel oil and kerosene", when as used herein such boil at or below 385° C. (725° F.), (ii) "Kerosene: A light petroleum distillate that is used in space heaters, cook stoves, and water heaters and is suitable for use as a light source when burned in wick-fed lamps. Kerosene has a maximum distillation temperature of [204.4° C.] (401° F.) at the 10-percent recovery point, a final boiling point of [300° C.] (572° F.), and a minimum flash point of [37.8° C.](100° F.). Included are No. 1-K and No. 2-K, the two grades recognized by ASTM Specification D 3699 as well as all other grades of kerosene called range or stove oil, which have properties similar to those of No. 1 fuel oil." (iii) "Light gas oils: Liquid petroleum distillates heavier than naphtha, with an approximate boiling range from [205° C. to 343.8° C.] (401° F. to 650° F.)" and (iv) that portion boiling at or below 385° C. (725° F.) of (iv) "Heavy gas oil: Petroleum distillates with an approximate boiling range from 343.8° C. to 537.8° C. (651° F. to 1000° F.)", repeating requirement that only such portion boiling at or below 385° C. (725° F.) is within (M). (M) comprises also those materials within EIA definitions (v) "Kerosene-type jet fuel", (vi) "No. 1 Distillate" (vii) "No. 1 Diesel Fuel" (viii) "No. 2 Distillate", (ix) "No. 2 Diesel Fuel" (x) "No. 2 Fuel Oil" (xi) "Distillate Fuel Oil and (xii) possibly a portion of a No. 4 Fuel or No. 4 Diesel Fuel, provided for all of the foregoing the minimum requirements of boiling at or below about 385° C. (725° F.) are met. EIA defines diesel fuels broadly to include blends comprising residual oils as "Diesel fuel: A fuel composed of distillates obtained in petroleum refining operation or blends of such distillates with residual oil used in motor vehicles. The boiling point and specific gravity are higher for diesel fuels than for gasoline." Thus, since a residual oil may be within a material identified as a diesel, those skilled in the refining art will evaluate whether a tendered diesel is a (M) or (H) based on the factors taught by this invention. Many diesels which are EIA defined "High Sulfur Diesel (HSD) fuel: Diesel fuel containing more than 500 parts per million (ppm) sulfur" likely fall within (M) or (H), subject to other requirements of this invention as further explained herein. However, EIA defined "Low sulfur diesel (LSD) fuel: Diesel fuel containing more than 15 but less than 500 parts per million (ppm) sulfur" and "Ultra-low sulfur diesel (ULSD) fuel: Diesel fuel containing a maximum 15 parts per million (ppm) sulfur" likely fall within (M), but could fall within (H) due to other requirements of this invention as further explained herein.

A required attribute of the (M) Constituent range is that (M) average (referred often as bulk) density for such range should be 820 Kg/M3 at 15° C. to 880 Kg/M3 at 15° C. to enable such range to form a portion of a combination of this invention for the combination density to be 820 to 880 Kg/M3 at 15° C., subject to other limitations taught herein.

That is, individual constituents of (M) may fall outside the range but the aggregate of (M) fall with 820 to 880 Kg/M3 at 15° C.

In variations, (M) Constitutent range will have a sulfur content above the breakpoint prior to treatment for removal of sulfur, for example, by hydrotreating disclosed herein; however after treatment, (M) sulfur content should be below the breakpoint, except in narrow cases where (M) Constitute may be more than breakpoint if the sulfur content of treated (M), for example as hydrotreater effluent, is combined with treated (H) for example as hydroconverter effluent, and when both are combined with (L), such combination of (L), (M) and (H) to not exceed the fuel sulfur limit. The higher level of breakpoint selected enables the maximum amount of material within (L) to bypass downstream processing, such as hydrotreating if used for sulfur removal and thereby reduces hydrogen generation costs and other operational costs. In one variation, (M) is subject to hydrotreating to produce a very low sulfur effluent in the range of about 10 ppmwt and very low or essentially metals free. Various grades of certain hydrotreated materials that can be selected for use used as components of (M), or precursors, are publicly listed via Platts, a well known industry offering system. If (M) is not present or nor added, then the boundary between (L) and (H) are to meet the requirements of (M).

Components of "(H)" or "Heavy Constituent" as used herein means refined or partially refined petroleum fractions having initial boiling point of about 385° C. (725° F.) to about 410° C. (770° F.) and a final boiling point of about 815° C. (1499° F.) or less, subject to requirements herein taught. Such (H) final boiling point is an attribute of the (H) Constituent that can be known upon procurement inquiry or production testing. In one variation, the (H) final boiling point is set by a feedstock and/or a process condition, such as the highest boiling point of a component of a stream recovered from solvent separation and subsequently treated in either a hydrotreating or hydroconversion reactor, recovered and combined into said fuel.

One essential attribute of (H) constituent range is that, during manufacture, suitable amount of its components have been treated to reduce presence of sulfur and certain heavy asphaltenes and metals, for example by solvent separation discussed herein above and/or treated by hydroconversion and/or hydrotreating as discussed herein, or other treatment process, for sulfur and metals reduction to a level to enable its addition to a combination of (L), (M) and (H) to meet sulfur and metals specifications of the fuels of this invention. Another essential attribute of the (H) range component is that its contribution to (H) range density, and to the final fuel combination, should enable forming a portion of a combination (L), (M) and (H) of this invention where the fuel combination density is 820 Kg/M3 at 15° C. and less than 880 Kg/M3 at 15° C., subject to other limitations taught herein.

Thus, when practicing the teaching of this invention, producing or procuring one or more suitable components of (H) or Heavy Constituents, or the feedstocks and processes to produce same, are known to those skilled in the refining art, subject to the limitations taught herein. In many variations found in the refining 'warehouse' of available materials, starting materials for components of (H) include, but are not limited to, EIA assigned definitions of (i) that portion boiling above about 385° C. (725° F.) of (iii) "Heavy gas oil: Petroleum distillates with an approximate boiling range from 343.8° C. to 537.8° C. (651° F. to 1000° F.)", repeating requirement that only such portion boiling above 385° C. (725° F.) is within (H). (H) also comprises "Heavy gas oil: Petroleum distillates with an approximate boiling range from 651° F. to 1000° F." with initial boiling point of about 385° C. (725° F.), (ii) Residual fuel oil: A general classification for the heavier oils, known as No. 5 and No. 6 fuel oils, that remain after the distillate fuel oils and lighter hydrocarbons are distilled away in refinery operations. It conforms to ASTM Specifications D 396 and D 975and Federal Specification VV-F-815C. No. 5, a residual fuel oil of medium viscosity, is also known as Navy Special and is defined in Military Specification MIL-F-859E, including Amendment 2 (NATO Symbol F-770). It is used in steam-powered vessels in government service and inshore powerplants. No. 6 fuel oil includes bunker C fuel oil and is used for the production of electric power, space heating, vessel bunkering, and various industrial purposes and (ii) EIA defined "No. 6 Residual fuel oil".

FIG. 4 illustrates one embodiment of composition of a fuel of this invention produced from a process of this invention.

FIG. 4 shows, for a reference crude processed by this invention, two profiles against volume fraction: a temperature profile 602 and specific gravity profile 604. That is, in FIG. 4, for both the top chart and bottom chart, x-axis 610 is volume fraction of crude. Top chart y-axis 612 shows as data points boiling points in degrees Centigrade for various cuts, through which the temperature profile curve 602 is drawn. FIG. 4 bottom chart y-axis 614 shows specific gravity data for the reference crude, through which a density profile curve 604 is drawn.

In and through both the top and bottom charts of FIG. 4, two (2) vertical dotted lines LM 606 and MH 608 are drawn intersecting the temperature profile 602 and density profile 604 curves.

The vertical lines LM 602 and MH 604 are drawn at selected yield splits of (L) range 622 and (M) range 624 as volume fractions of the reference crude. In FIG. 4, the intersection of LM 606 is selected at 205° C. and MH 608 is 385° C., to determine those respective ranges for (L) 622 and (M) 624. For a crude lighter or heavier than the reference, lines shift to the right or left.

Point 609 represents the end of (H) range including vacuum gas oils cut to 565° C. and deasphalted oil lifted from remaining vacuum residual above 565° C. The temperature at point 609 will depend on the deasphalted oil lift, with the understanding that from point 609 to one hundred (100) volume percent representing the pitch is not shown. Temperature point 611 is the heavy vacuum gas oil cut point part of treated (H) used for the combination, with that portion of (H) 626, from point 611 to 609 being the deasphalted oils. Corresponding density points are shown in FIG. 4 as 615 for full range of unprocessed crude and 613 is a straight line passing through the bulk densities of (L), (M), & (H) for processed crude.

Thus, the highest boiling end point of (L) range 622 and initial boiling point of (M) range 624 share a common vertical line LM 606. The highest boiling end point of (M) range 624 and initial boiling point of (H) range 626 share a different common vertical line MH 608. The actual endpoint 609 of the precursor to (H) range 626 is cut off as taught by other embodiments of this invention and discussed in the definition of (H) to remove certain heavier asphaltenes and other complex hydrocarbons and to substantially eliminate metals and leave a very low sulfur (H) contribution to the final fuel.

FIG. 4 further illustrates, from disclosures herein provided regarding fuel produced by a process of this invention, how to combine constituents within (L), (M) and (H) to form a fuel composition that simulates a fuel of this invention produced from a process of this invention. In an overview as one variation, one examines a constituent, and plots density against volume fraction to find a center point of its (M) range within the required 820 Kg/M3 at 15° C. minimum at line 640 to 880 Kg/M3 at 15° C. maximum at line 642, that being, the point 630 (Density Pivot defined later) at which density versus volume intersect with the middle of (M) range, plus or minus ten volume percent (+/−10%) or if very little or no (M) range constituents are present, then at an imputed point such as at or between where (L) ends (H) begins. The center dark square 630 is the (M) range bulk density mid-point with 631 and 633 being bulk density center points for (L) and (H) ranges respectively.

If a lighter crude than the reference crude is processed by a process of this invention to make the fuel, the vertical lines LM 606 and MH 608 shift to the right, as do ranges of (L) 622, (M) 624 and (H) 626, meaning there is a greater volume of lighter constituent (L) range 622 and less of (H) 626. The Density Pivot 630 moves slightly remains within the Density Fulcrum 632 (defined later) even though fuel density decreases. The opposite occurs if a heavier crude than the reference crude is processed by a process of this invention to make the fuel. That is the vertical lines LM 626 and MH 628 shift to the left, meaning there is a greater volume of constituent (H) and less of (L). The fuel combination Density Pivot 630 point is to remain within the 820 to 880Kg/M3 density zone between lines 640 and 642 even though fuel density increases. In the instances of such lighter and heavier feeds, for the combination fuel, there should be enough (L) and (H) constituents (as well as (M) constituents if present) with aggregate requisite densities to balance each range of (L) and (H) to deliver a fuel having a bulk density within the 820 to 880 Kg/M3 fuel combination density zone between lines 640 and 642.

Thus very light feeds such as light tight oils or condensates which are primarily (L) range materials do not have enough heavier materials (M) or (H) to serve as sole material to bring final product bulk density within the Density Fulcrum to have a fuel within 820 to 880 Kg/M3 fuel combination density zone.

As used in the specification and claims, the terms (a) "Density Fulcrum" means a bulk density between 820 and 880 KG/M3 at 15° C., center positioned at or near the Density Pivot (defined next below) within about ten volume percent (+/−10 vol %) of a volume fraction range at the Density Pivot. For illustration, not limitation, measured within 43 to 53 volume percent, for nominal 48 volume percent, or 80 to 90 volume percent for nominal 85 volume percent and (b) "Density Pivot" means the centerpoint of the Density Fulcrum, so that when equal volumes of constituents (L) and (H) are combined, either with or without constituent (M), a balanced density can be achieved. All such cited lines pass through the required bulk Density Fulcrum which serves an essential guiding role in formulation of the fuel to either lift one end range of the density curve 604 or drop the end of the curve 604, so that both ends fall within the 820 to 880 Kg/M3 fuel combination density zone between lines 640 and 642, with bulk density for the combination to be at point 630, Examing the density profile 604 shown in FIG. 4, one is taught that the densities (bulk) extend are almost in linear profile, give and take a small variation, but sloped outside the parallel zone range of the Density Fulcrum 632 and pivoted at or near the center 630 of the Density Fulcrum. As shown, when the density range is from 882 to 880 Kg/M3, at 15° C. substantially equal volumes of (L) and (H) will lift and rotate the line 604 for the total blend to fall in the bulk density range between 640 and 642 of a clean fuel of this invention.

If final combination fuel product density is below the lowest density of the Density Fulcrum 632 (e.g. below about 820 lower density requirement), then the heating value drops, requiring increased fuel consumption to achieve same energy effectiveness. If final product density is above the highest density of the Density Fulcrum 632 (e.g. above about 880 upper top density requirement) then issues arise associated with engine fuel feed and handling systems and other end uses.

It is a surprise that it is possible that (M) can be substantially reduced or removed without disturbing balance on the Density Fulcrum and still form an acceptable fuel of (L) and (H), if all other conditions are meet. This enables certain top and bottom of the barrel combinations, with withdrawals of diesel range from (M) yet still forming an acceptable fuel of remaining (L) and (H).

FIG. 5. illustrates, for example, how to use light tight oil as (L) range constitute 'top of the barrel' with another constituent as (H) 'bottom of the barrel' to form a fuel composition that simulates a fuel produced from a process of this invention.

In FIG. 5, a condensate is used as reference light tight oil type material shown in top portion chart of the FIG. 5. This is an example of a light 'top of the barrel' material, having a 53° API, having about 69 vol % (L) range 722 ending at line 706 and only has only 28 vol % (M) 724 ending at line 708 and about three percent (3 vol %) atmospheric residue bottoms as part of (H)1 shown as 726 contribution toward a final combination. The condensate reference material yield curve 702 at various temperatures 712 plotted against volume fraction 710 is shown in table chart of FIG. 5. As noted, this reference material assay translates as a general approximation to about 69 volume % (L) range 722 and 28 volume % (M) range 724 and minor about 3 volume % (H)1 range 726. End point 711 is shown at one hundred (100 volume %) since the bottoms are relatively light gas oil range materials with little heavy residue. If the Density Fulcrum were shown for the reference alone (without added (H)2 shown only in bottom chart of FIG. 5), it would appear far to the right around about 85% of the volume fraction of the original reference without added (H)2. Thus to achieve a balance for a combined curve within the 820 to 880 Kg/M3 density target range between lines 740 and 742, then at least an additional (M) range constituents, or preferably (M)+(H) constituents or more preferably primarily a (H) range material with components of (M) such are needed for combination.

In this example shown in the bottom chart of FIG. 5, to each barrel of this reference condensate naturally occurring as about 69 volume % (L) 722 and 28 volume % (M) 724 and 3 volume % H1 range 726, added from another source is 0.69 barrel of (H)2 non-condensate 727, for example produced as a full range effluent from hydroconversion. The center dark square 730 is the (M) range bulk density mid-point with 731 and 733 being bulk density center points for (L) and total (H) ranges respectively. That combination with (H)2 added forms 1.69 barrel (100 volume percent shown in FIG. 5 bottom chart as (L) plus (M) plus (H)1 plus (H)2 of formulated clean fuel of this invention as simulated, having a density in with the 820 to 880 Kg/M3 required range, for a fuel product API of about 25 to 28 this instance as shown in Table 1:

TABLE 1

| | Metric | | | | |
|---|---|---|---|---|---|
| | 'Top of the barrel' Condensate | | 'Bottom of the barrel' Hydro-converson effluent | | Formulated fuel (L) + (M) + |
| Constituent | (L) | (M) | (H)1 | (H)2 | (H)1 + (H)2 |
| barrel | 0.69 | 0.28 | 0.03 | 0.69 | 1.69 |
| fraction | 0.408 | 0.166 | 0.018 | 0.408 | 1 |
| specific gravity | 0.7370 | 0.8296 | — | 0.9042 | 0.8222 | where the formulated fuel in Table 1 meets the low sulfur and metal specification.

In yet another variation of this invention, the amount of M to the combination is reduced to near zero. This is done due to shortages in supply of diesels and other materials within the (M) range, being sought after for ultra low sulfur diesel highway requirements and great demand for low sulfur marine and gas turbine applications. In this variation, combinations of essentially equal parts of (L) and (H) are made to form the formulated fuel, with little or no (M). Choice of a 'heavier condensate' or light tight oil will provide more atmospheric residue, and in some instances, some gas oil range materials, to shift the vertical (LM) lines to the left and the Density Fulcrum will move up as the density increases from contribution of the heavier light tight oil.

In one embodiment applying above, we have a novel formulated fuel comprising a combination of one or more constituents of (L), (M), and (H), where based on 100 volume percent total, the respective amounts combined are determined as follows: (a) (L)%+(M)%+(H)%=100% and (b) (L)%=(H)%=(100%−(M)%)/2) and (c) if (M)% is zero or otherwise less than 100%, the remainder is (L)%/(H)% in ratio of 0.4/1 to 0.6/1, wherein such combination has fuel (1) density within 820 to 880 Kg/M3 at 15° C., (2) sulfur content of 0.25 wt. % or less and (3) total metals content of 40 ppmwt or less. In one variation, sulfur is reduced to 0.1 wt. % or less and metals are reduced to 25 ppmwt or less. In a variation, (M) is present from 10 to 90% and remainder is (L)/(H) in ratio of 0.4/1 to 0.6/1. In another variation, (M) is changed to be present from 20 to 80% and remainder is (L)/(H) in ratio of 0.4/1 to 0.6/1, and yet another variation, (M) is present from 30 to 70% and remainder is (L)/(H) in ratio of 0.4/1 to 0.6/1. In a simplified embodiment, (M) ranges from 30% to 70% by volume and the remainder is substantially equal parts of (L) and (H) at (L)/(H) in ratio of 0.9/1 to 1/0.9, and another embodiment (M) ranges from 40% to 60% by volume of the total, density is within 820 to 880 Kg/M3 at 15° C., sulfur is 0.25 wt. % or less and metals are 40 ppmwt or less.

Thus we have found that a very low 0.1 wt. % sulfur fuel can be formulated or produced by targeting a density within 820 to 880 Kg/M3 at 15° C., or less, using manufacturing precurors or constituents comprising hydrocarbons derived from a combination of light tight oil and hydroconverted high sulfur fuel oil, said fuel having an initial boiling point being the lowest boiling point of any fraction of either said oils at atmospheric distillation conditions and highest boiling point being the highest boiling point of the residual portion of said high sulfur fuel oil which is soluble in a solvent suitable for solvent separation. For example, when practicing this invention, if heptane is chosen as the solvent for procurement metrics for combination constituent purchase, or for production by use of solvent separation portion of a manufacturing process of this invention, then the highest boiling end, whether treated or untreated, within the combination will be higher than if pentane is selected as solvent for metric or manufacture.

We have found that we can use the foregoing disclosed processes to select or treat precursors of (L)+(M)+(H) to simulate a formulated fuel combination of a wide range of hydrocarbons useful as a clean turbine fuel having the following properties: (a) sulfur from 0.05 wt. % (500 ppmwt) to 0.1 wt. % (1000 ppmwt) per ISO 8754, (b) density from 820 to 880 Kg/M3 at 15° C. per ASTM D4052, (c) total metals of 25 ppmwt or less, preferable less than 10 ppmwt, and even more preferably less than 1 ppmwt per ISO 14597, (d) HHV from 43.81 to 45.15 MJ/kg, and (e) LHV from 41.06 to 42.33 MJ/kg. Flash point will vary based upon the lowest flash point constituent of the combination. We have found variations have the following additional simulated properties: (a) kinematic viscosity at 50° C. less than10 mm$^2$/s where 1 mm$^2$/s=1 cSt per ISO 3104, (b) carbon residue is the range of 0.32 to 1.5 per ISO 10370, (c) existent gum is less than 5 per ISO 6246, (d) oxidation stability is about 0.5 per ASTM D2272, and (e) acid number less than 0.05 mg KOH/g per ASTM D664. For use as marine fuel, reference is made to by testing or computation methods specified by ISO 2817-10.

Thus, the present invention has broad application to production of fuels having reduced, low levels of sulfur and other contaminants and to uses of such fuels. Certain features may be changed without departing from the spirit or scope of the present invention. Accordingly, the invention is not to be construed as limited to the specific embodiments or examples discussed but only as defined in the appended claims or substantial equivalents of the claims.

The invention claimed is:
1. A fuel (600) comprising
(a) light tight oil (1) and
(b) hydroconverted liquid (411) of residue hydroconversion (401)) wherein said hydroconverted liquid (411) comprises hydrocarbons from
(1) hydroconverted (401) high sulfur fuel oil (41) and
(2) soluble oil (311) from solvent separation (301) of unconverted oils (409) from said residue hydroconversion (401),
said fuel having an actual sulfur content of 0.5 wt. % or less and a density within 820 to 880 Kg/M3 at 15° C. and comprises a range of hydrocarbons from (i) initial boiling hydrocarbons of 1(a) light tight oil to (ii) highest boiling point being highest boiling hydrocarbons of 1.(b)(1) or 1.(b)(2).

2. A fuel characterized by comprising a light tight oil and soluble oils of solvent separation of oils comprising hydroconverted high sulfur fuel oil, said fuel having a range of hydrocarbons from initial boiling hydrocarbons of naphtha from said light tight oil to highest boiling hydrocarbons of said soluble oils, said fuel having a density within 820 to 880 Kg/M3 at 15° C. and sulfur of 0.1 wt. % or less.

3. A fuel (600) having a density within 820 to 880 Kg/M3 at 15° C. and sulfur content of 0.5 wt.% or less, comprising
(a) light tight oil (1) having a density API (Deg) in the range of 38 to 57 degrees and sulfur content in the range of (0) wt.% to 0.2 wt. %, said light tight oil (1) selected from the group consisting of one or more of well head condensate, non-associated natural gas condensates, shale gas condensate or light crude, (b) hydroconverted liquid (411) of hydroconversion (401) having a density, API (Deg) in the range of 26 to 30 degrees, said liquid (411) comprising hydroconverted residual.

4. A fuel of claim 3 wherein said hydroconverted residual comprises hydroconverted sulfur fuel oil (41) having a density API in the range of 14 to 21 degrees, alone or with hydroconverted vacuum residual, another hydroconverted heavy residual or hydroconverted extra heavy crude.

5. A fuel of claim 3 wherein said hydroconverted liquid (411) comprises hydroconverted soluble (311) unconverted oils (409) of hydroconverted residual recycled for hydroconversion (401).

6. A fuel of claim 3 which has
(a) initial boiling point being that of lowest boiling component
  (1) of said light tight oil (1) or
  (2) of said hydroconverted liquid (411) so combined and
(b) highest boiling point being that of highest boiling soluble component of hydroconverted (411) liquid so combined.

7. A fuel (600) of claim 3 comprising a range of hydrocarbons from C5 boiling point up to the maximum boiling point of highest boiling soluble hydroconverted liquid (411) boiling below the initial boiling point of insoluble unconverted oils (351) of hydroconversion (401).

8. A fuel (600) of claim 3 comprising a range of hydrocarbons having
(a) initial boiling hydrocarbon of 57(a) light tight oil (1) comprising liquefied petroleum gas range to
(b) highest boiling point of highest boiling soluble hydroconverted liquid (411) subsequently treated by hydrogen in presence of catalyst.

9. A fuel (600) of claim 3 wherein said light tight oil (1) has a density API in the range of 45 to 55 degrees.

10. A fuel (600) of claim 3 wherein said fuel has a sulfur content of less than 0.1 wt. % sulfur.

* * * * *